US012576549B2

(12) United States Patent
Velderman et al.

(10) Patent No.: US 12,576,549 B2
(45) Date of Patent: Mar. 17, 2026

(54) ELECTROSTATIC CLUTCH FOR POWER TOOL

(71) Applicant: BLACK & DECKER INC., New Britain, CT (US)

(72) Inventors: Matthew J. Velderman, Baltimore, MD (US); Geoffrey S. Howard, Towson, MD (US); Matthew Lazzaro, Towson, MD (US)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 18/487,949

(22) Filed: Oct. 16, 2023

(65) Prior Publication Data

US 2024/0131676 A1    Apr. 25, 2024
US 2024/0227148 A9    Jul. 11, 2024

Related U.S. Application Data

(63) Continuation of application No. PCT/US2022/022346, filed on Mar. 29, 2022.
(Continued)

(51) Int. Cl.
*B25F 5/00* (2006.01)
*H02N 13/00* (2006.01)
*B25B 23/147* (2006.01)

(52) U.S. Cl.
CPC ............. *B25F 5/001* (2013.01); *H02N 13/00* (2013.01); *B25B 23/147* (2013.01)

(58) Field of Classification Search
CPC ............ B25F 5/001; B25F 5/00; H02N 13/00
See application file for complete search history.

(56) References Cited

U.S. PATENT DOCUMENTS 2,666,512 A    1/1954   Codier
2,897,424 A    7/1959   Waring
(Continued)

FOREIGN PATENT DOCUMENTS

CA        589774 A    12/1959
CA        590173 A     1/1960
(Continued)

OTHER PUBLICATIONS

Vivek Ramachandran et al., "All-Fabric Wearable Electroadhesive Clutch," Advanced Science News, 2019, 4, 1800313, 10 pages, Wiley-VCH Verlag GmbH & Co. KGaA, Weinheim, Germany.
(Continued)

*Primary Examiner* — Gloria R Weeks
(74) *Attorney, Agent, or Firm* — Brake Hughes Bellermann LLP

(57) ABSTRACT

A power tool that includes a housing, a motor, an end effector, an electrostatic clutch assembly, and a control circuit is provided. In a first mode of operation, the control circuit causes a first voltage to be applied to a first electrode and a different second voltage to be applied to a second electrode, generating a first attractive force between the first and second electrodes, which causes an output member to rotate together with an input member when a torque on the output member is less than or equal to a first threshold value and which causes the output member to rotationally slip relative to the input member when the torque on the output member exceeds the first threshold value, interrupting torque transmission from the input member to the output member.

20 Claims, 19 Drawing Sheets

Related U.S. Application Data

(60) Provisional application No. 63/176,091, filed on Apr. 16, 2021.

(56) References Cited

U.S. PATENT DOCUMENTS

| | | | |
|---|---|---|---|
| 2,897,934 A | | 8/1959 | Fitch |
| 2,909,996 A | | 10/1959 | Fitch |
| 2,923,390 A | | 2/1960 | Fitch |
| 3,002,596 A | | 10/1961 | Fitch |
| 3,057,529 A | | 10/1962 | Fitch |
| 3,150,678 A | | 9/1964 | Nuber |
| 3,198,409 A | | 8/1965 | Anderson |
| 3,240,306 A | | 3/1966 | Armstrong |
| 3,241,002 A | | 3/1966 | Smith |
| 3,325,709 A | | 6/1967 | Anderson |
| 3,343,635 A | | 9/1967 | Wilson et al. |
| 3,343,636 A | | 9/1967 | Donelan et al. |
| 3,356,195 A | | 12/1967 | Kenneth et al. |
| 3,538,363 A | | 11/1970 | Maryanovsky et al. |
| 3,871,944 A | | 3/1975 | Dominguez-Burguette |
| 4,418,765 A | * | 12/1983 | Mori ............... B25B 23/14 |
| | | | 81/470 |
| 4,751,609 A | | 6/1988 | Kasahara |
| 4,896,754 A | | 1/1990 | Carlson et al. |
| 4,997,698 A | | 3/1991 | Oboodi et al. |
| 5,014,793 A | | 5/1991 | Germanton et al. |
| 5,054,593 A | | 10/1991 | Carlson |
| 5,090,531 A | | 2/1992 | Carlson |
| 5,094,328 A | | 3/1992 | Palmer |
| 5,486,974 A | | 1/1996 | Kasahara |
| 5,620,071 A | | 4/1997 | Ishikawa et al. |
| 6,791,817 B2 | | 9/2004 | Allison et al. |
| 7,395,903 B2 | | 7/2008 | Takahashi et al. |
| 7,413,029 B2 | * | 8/2008 | Seno ............... B23P 19/06 |
| | | | 81/57.44 |
| 7,551,419 B2 | | 6/2009 | Pelrine et al. |
| 7,554,787 B2 | | 6/2009 | Pelrine et al. |
| 7,598,651 B2 | | 10/2009 | Kornbluh et al. |
| 7,773,363 B2 | | 8/2010 | Pelrine et al. |
| 7,872,850 B2 | | 1/2011 | Pelrine et al. |
| 7,977,923 B2 | | 7/2011 | Pelrine et al. |
| 8,020,683 B2 | | 9/2011 | Borys et al. |
| 8,111,500 B2 | | 2/2012 | Pelrine et al. |
| 8,125,758 B2 | | 2/2012 | Pelrine et al. |
| 8,264,813 B2 | | 9/2012 | Inazumachi et al. |
| 8,436,508 B2 | | 5/2013 | Kornbluh et al. |
| 8,488,295 B2 | | 7/2013 | Garcia et al. |
| 8,490,516 B2 | * | 7/2013 | Baba ............... B25B 21/023 |
| | | | 81/463 |
| 8,550,222 B2 | | 10/2013 | Browne et al. |
| 8,564,926 B2 | | 10/2013 | Prahlad et al. |
| 8,573,461 B2 | * | 11/2013 | Shelton, IV .......... A61B 34/71 |
| | | | 227/176.1 |
| 8,622,274 B2 | * | 1/2014 | Yates ............... F16D 27/01 |
| | | | 227/176.1 |
| 8,665,578 B2 | | 3/2014 | Pelrine et al. |
| 8,674,640 B2 | | 3/2014 | Suda et al. |
| 8,861,171 B2 | | 10/2014 | Prahlad et al. |
| 9,038,743 B2 | * | 5/2015 | Aoki ............... B25D 11/005 |
| | | | 173/178 |
| 9,093,926 B2 | | 7/2015 | Prahlad et al. |
| 9,130,484 B2 | | 9/2015 | Prahlad et al. |
| 9,130,485 B2 | | 9/2015 | Prahlad et al. |
| 9,266,233 B2 | | 2/2016 | Kornbluh et al. |
| 9,352,456 B2 | * | 5/2016 | Murthy ............... B25B 23/14 |
| 9,401,668 B2 | | 7/2016 | Prahlad et al. |
| 9,479,085 B1 | | 10/2016 | Ludois et al. |
| 10,138,953 B1 | | 11/2018 | Koenig et al. |
| 10,220,500 B2 | | 3/2019 | Lim et al. |
| 10,232,383 B2 | | 3/2019 | Prahlad et al. |
| 10,355,624 B2 | | 7/2019 | Majidi et al. |
| 10,554,154 B2 | | 2/2020 | Majidi et al. |
| 10,557,535 B2 | * | 2/2020 | Douglass ............. F16H 37/027 |
| 10,663,016 B2 | | 5/2020 | Schmitz et al. |
| 10,711,848 B2 | | 7/2020 | Koenig et al. |
| 10,749,450 B2 | | 8/2020 | Majidi et al. |
| 10,774,886 B2 | | 9/2020 | Eckerle et al. |
| 10,852,825 B2 | | 12/2020 | Yoon et al. |
| 10,860,102 B2 | | 12/2020 | Remaley et al. |
| 10,906,168 B2 | | 2/2021 | Kornbluh et al. |
| 10,998,835 B2 | | 5/2021 | Majidi et al. |
| 11,023,047 B2 | | 6/2021 | Holbery et al. |
| 11,036,295 B2 | | 6/2021 | Moessinger et al. |
| 11,039,974 B2 | | 6/2021 | Kodama et al. |
| 11,054,905 B2 | | 7/2021 | Remaley et al. |
| 11,061,476 B2 | | 7/2021 | Remaley et al. |
| 11,065,771 B2 | | 7/2021 | Shintake et al. |
| 11,177,152 B2 | | 11/2021 | Minemura |
| 2002/0062967 A1 | * | 5/2002 | Ziegler ............... B25D 16/003 |
| | | | 173/216 |
| 2003/0136626 A1 | | 7/2003 | Ciaramitaro et al. |
| 2004/0245054 A1 | | 12/2004 | Takahashi et al. |
| 2006/0124332 A1 | * | 6/2006 | Greese ............... B25B 23/14 |
| | | | 173/178 |
| 2006/0237205 A1 | * | 10/2006 | Sia ............... B25B 23/1405 |
| | | | 173/128 |
| 2007/0084613 A1 | | 4/2007 | Zhang et al. |
| 2008/0089002 A1 | | 4/2008 | Pelrine et al. |
| 2008/0127711 A1 | * | 6/2008 | Farag ............... G01L 25/003 |
| | | | 73/1.11 |
| 2008/0142327 A1 | | 6/2008 | Shchokin et al. |
| 2009/0045042 A1 | | 2/2009 | Browne et al. |
| 2009/0047197 A1 | | 2/2009 | Browne et al. |
| 2011/0081519 A1 | | 4/2011 | Dillingh et al. |
| 2011/0132713 A1 | | 6/2011 | Biegger et al. |
| 2011/0315477 A1 | | 12/2011 | Prahlad et al. |
| 2012/0154974 A1 | | 6/2012 | Bhatnagar et al. |
| 2012/0169256 A1 | | 7/2012 | Suda et al. |
| 2013/0186699 A1 | | 7/2013 | Prahlad et al. |
| 2014/0064905 A1 | | 3/2014 | Prahlad et al. |
| 2014/0104744 A1 | | 4/2014 | Prahlad et al. |
| 2014/0251701 A1 | | 9/2014 | Prahlad et al. |
| 2015/0369344 A1 | | 12/2015 | Koenig et al. |
| 2016/0017940 A1 | | 1/2016 | Eckerle |
| 2016/0099663 A1 | | 4/2016 | Petrowsky et al. |
| 2017/0222576 A1 | | 8/2017 | Majidi et al. |
| 2018/0143687 A1 | | 5/2018 | Moessinger et al. |
| 2018/0326596 A1 | | 11/2018 | Prahlad et al. |
| 2019/0047157 A1 | | 2/2019 | Shintake et al. |
| 2019/0107157 A1 | | 4/2019 | Schmitz et al. |
| 2019/0242026 A1 | | 8/2019 | Choi et al. |
| 2019/0339773 A1 | | 11/2019 | Holbery et al. |
| 2020/0000377 A1 | | 1/2020 | Ly et al. |
| 2020/0075383 A1 | | 3/2020 | Minemura |
| 2020/0081532 A1 | | 3/2020 | Yoon et al. |
| 2020/0356168 A1 | | 11/2020 | Remaley et al. |
| 2020/0371591 A1 | | 11/2020 | Remaley et al. |
| 2021/0078153 A1 | * | 3/2021 | Sunabe ............... H02P 29/0027 |
| 2021/0211069 A1 | | 7/2021 | Reed et al. |
| 2021/0234476 A1 | | 7/2021 | Reed et al. |
| 2021/0257930 A1 | | 8/2021 | Reed et al. |
| 2021/0273583 A1 | | 9/2021 | Corrigan et al. |
| 2021/0281193 A1 | | 9/2021 | Reed et al. |

FOREIGN PATENT DOCUMENTS

| | | | |
|---|---|---|---|
| CA | 595789 A | 4/1960 | |
| CA | 638449 A | 3/1962 | |
| DE | 1255430 B | 11/1967 | |
| DE | 2058190 A1 | 5/1971 | |
| DE | 9302561 U1 | 2/1994 | |
| EP | 1909308 A1 | 4/2008 | |
| EP | 2650085 A2 | 10/2013 | |
| EP | 3158228 A2 | 4/2017 | |
| EP | 3160784 B1 | 5/2019 | |
| EP | 3695130 A1 | 8/2020 | |
| EP | 3769187 A1 | 1/2021 | |
| EP | 3821322 A1 | 5/2021 | |
| EP | 3847525 A1 | 7/2021 | |
| EP | 3966663 A1 | 3/2022 | |
| EP | 3977240 A1 | 4/2022 | |
| GB | 843949 A | 8/1960 | |

(56)                    References Cited

FOREIGN PATENT DOCUMENTS

| IN | 202041052409 A | 12/2020 |
|---|---|---|
| JP | S4841469 U | 12/1973 |
| JP | H0937579 A | 2/1997 |
| JP | 2016048089 A | 4/2016 |
| WO | 1998047176 A1 | 10/1998 |
| WO | 2011116357 A2 | 9/2011 |
| WO | 2016057963 A1 | 4/2016 |
| WO | 2017199035 A1 | 11/2017 |
| WO | 2018098019 A1 | 5/2018 |
| WO | 2021002925 A1 | 1/2021 |
| WO | 2021116618 A1 | 6/2021 |
| WO | 2021118789 A1 | 6/2021 |
| WO | 2021138690 A1 | 7/2021 |
| WO | 2022031609 A1 | 2/2022 |
| WO | 2022232705 A1 | 11/2022 |
| WO | 2022232707 A1 | 11/2022 |
| WO | 2022241326 A1 | 11/2022 |

OTHER PUBLICATIONS

Abraham Simpson Chen and Sarah Bergbreiter, "A Comparison of Critical Shear Force in Low-voltage, All-polymer Electroadhesives to a Basic Friction Model," Smart Materials and Structures, 2017, 12 pages, IOP Publishing Ltd, United Kingdom.
Ronan Hinchet and Herbert Shea, "High Force Density Textile Electrostatic Clutch," Advanced Materials Technologies, 2019, 7 pages, Wiley-VCH Verlag GmbH & Co. KGaA, Weinheim, Germany.
Erez Krimsky and Steven H. Collins, "Optimal Control of an Energy-Recycling Actuator for Mobile Robotics Applications," 2020 IEEE International Conference on Robotics and Automation (ICRA), May 31-Aug. 31, 2020, Paris, France, pp. 3559-3565, IEEE.
Quan Xiong et al., "So-EAGlove: VR Haptic Glove Rendering Softness Sensation with Force-Tunable Electrostatic Adhesive Brakes," IEEE Transactions on Robotics, 2022, 13 pages, IEEE.
Communication pursuant to Article 94(3) EPC, EP Application No. 22720813.9, Oct. 23, 2024, 5 pages, EPO.
C. J. Fitch, "Development of the Electrostatic Clutch," in IBM Journal of Research and Development, vol. 1, No. 1, Jan. 1957, pp. 49-56.
Geoffrey John Levermore, "Some Interface Phenomena Associated with the Johnsen-Rahbek Effect," A Thesis submitted for the degree of Doctor of Philosophy of the University of London, Jun. 1975, 227 pages.
A. Olivei, "New Low-Voltage Electrostatic clutches Employing a Special Class of Dielectric Materials," in IEEE Transactions on Industrial Electronics and Control Instrumentation, vol. IECI-17, No. 2, Apr. 1970, pp. 78-98.
W. C. Clinton & R. L. Lyon (1963) The Effect of Adsorbed Films on the Attractive and Frictional Forces Developed in an Electrostatic Clutch, A S L E Transactions, 6:3, 209-217.
International Search Report for PCT Application No. PCT/US2022/022346, mailed on Aug. 12, 2022, 13 pages.

* cited by examiner

ELECTROSTATIC CLUTCH FOR POWER TOOL

RELATED APPLICATION

The present patent application claims priority under 35 U.S.C. § 120 as a continuation of PCT Application No. PCT/US2022/022346, filed Mar. 29, 2022, titled "ELECTROSTATIC CLUTCH FOR POWER TOOL," which claims priority to U.S. Provisional Application No. 63/176,091, filed Apr. 16, 2021, titled "ELECTROSTATIC CLUTCH FOR POWER TOOL," each of which is hereby incorporated by reference in its entirety.

FIELD

The present patent application relates to power tools and electrostatic clutches/mechanisms for power tools.

BACKGROUND

Many power tools, such as power drills, power drivers, power fastening tools and/or other power tools, have a mechanical clutch that interrupts power transmission to the output spindle/shaft when the output torque exceeds a threshold value of a maximum torque. U.S. Pat. No. 9,494,200, which is incorporated by reference in the patent application in its entirety, provides an exemplary prior art mechanical clutch. Such a mechanical clutch is a purely mechanical device that breaks a mechanical connection in the transmission to prevent torque from being transmitted from the motor to the output spindle/shaft of the power tool. Clutches or slip clutches are generally used in the power tools to provide torque limited application at the working bit. Traditional slip clutches have been executed mechanically with balls, springs, and clutch plates. In these mechanical clutches, the maximum torque threshold value may be user adjustable, often by a clutch collar that is attached to the power tool between the power tool and the tool holder/chuck. The user may rotate the clutch collar among a plurality of different positions for different maximum torque settings. The components of the mechanical clutches, however, tend to wear over time, and add excessive bulk and weight to a power tool.

In order to save length and cost, some power tools additionally or alternatively include an electronic clutch. Such an electronic clutch electronically senses the output torque (e.g., via a torque transducer) or infers the output torque (e.g., by sensing another parameter such as current drawn by the motor). U.S. Pat. No. 10,220,500, which is incorporated by reference in the present patent application in its entirety, provides an exemplary prior art electronic clutch. When the electronic clutch determines that the sensed output torque exceeds a threshold value, it interrupts or reduces power transmission to the output shaft/spindle, either mechanically (e.g., by actuating a solenoid to break a mechanical connection in the transmission) or electrically (e.g., by interrupting or reducing current delivered to the motor, and/or by actively braking the motor). Existing electronic clutches tend to be overly complex and/or inaccurate. For example, electronic clutches suffer in performance in that they sense current at the motor module to estimate the applied torque at the working bit. The intermediary elements (i.e., the motor & transmission) result in latency in applying torque limiting and also introduce inaccuracies.

Other type of clutches, such as electromagnetic clutches feature fast activation and moderate torque density, but require continuous electrical power to stay active. Magnetorheological clutches produce large torques, but are heavy and also require continuous power to remain active. Because of the power requirements, both of these systems require large batteries or tethered electrical connections. Batteries in particular account for a significant portion of the weight of many devices, such as power tools, especially in devices with clutches that require constant power.

FIG. 1 shows an exemplary prior art saw braking mechanism 150. The saw braking mechanism 150 works by sensing that the saw blade 152 is in contact with flesh of the user which then activates a compressed gas cartridge 156 to force a blade stopping element 154 into the saw blade 152 to quickly arrest motion of the saw blade 152. For example, U.S. Pat. No. 8,011,279, which is incorporated by reference in the present patent application in its entirety provides an exemplary prior art saw braking mechanism. The saw braking mechanism 150, when activated, is not recoverable and must be replaced. The saw braking mechanism 150 is also expensive, time consuming to replace, and results in work stoppage/lost productivity.

SUMMARY

The present patent application provides improvements in the clutches for power tools.

One aspect of the present patent application provides a power tool. The power tool includes a housing, a motor, an end effector, an electrostatic clutch assembly, and a control circuit. The housing is configured to be coupled to an electrical power source. The motor is received in the housing. The end effector is coupled to the housing and is configured to perform an operation on a workpiece. The electrostatic clutch assembly is disposed in the housing between the motor and the end effector. The electrostatic clutch assembly includes an input member configured to be rotationally driven by the motor, an output member configured to rotationally drive the end effector, a first electrode electrically couplable to the electrical power source, a second electrode electrically couplable to the electrical power source, and a dielectric layer separating the first electrode from the second electrode. The control circuit is disposed in the housing and is operatively cooperable with the electrostatic clutch assembly to control electrical power delivery from the electrical power source to the first and second electrodes. In a first mode of operation, the control circuit causes a first voltage to be applied to the first electrode and a different second voltage to be applied to the second electrode, generating a first attractive force between the first and second electrodes, which causes the output member to rotate together with the input member when a torque on the output member is less than or equal to a first threshold value and which causes the output member to rotationally slip or rotate relative to the input member when the torque on the output member exceeds the first threshold value, interrupting torque transmission from the input member to the output member.

In one embodiment, the first threshold corresponds to the first attractive force. In one embodiment, in a second mode of operation, the control circuit causes a third voltage to be applied to the first electrode and a different fourth voltage to be applied to the second electrode, generating a second attractive force between the first and second electrodes, which causes the output member to rotate together with the input member when a torque on the output member is less than or equal to a second threshold value and which causes the output member to rotationally slip or rotate relative to the input member when the torque on the output member exceeds the second threshold value, interrupting torque transmission from the input member to the output member. In one embodiment, a second voltage difference between the third voltage and the fourth voltage is greater than a first voltage difference between the first voltage and the second voltage, the second attractive force is greater than the first attractive force, and the second threshold value is greater than the first threshold value. In one embodiment, the power tool further comprises a selector switch coupled to the housing that is actuatable by a user to select between the first and second modes of operation. In one embodiment, in a third mode of operation, the control circuit causes a zero voltage difference to be applied to the first and second electrodes, allowing the second electrode to rotate relative to the first electrode and preventing torque transmission from the input member to the output member. In one embodiment, the control circuit is configured to automatically switch from the first mode to the third mode upon sensing that the output member has rotationally slipped or rotated relative to the input member. In one embodiment, in a fourth mode of operation, the clutch assembly is configured to prevent interruption of torque transmission from the input member to the output member.

In the fourth mode of operation, the control circuit may cause a fifth voltage to be applied to the first electrode and a different sixth voltage to be applied to the second electrode, generating a third attractive force between the first and second electrodes, the third attractive force exceeding a torque on the output member during operation of the power tool. The second voltage may have a polarity opposite a polarity of the first voltage. The first voltage difference may be user selectable to adjust the first attractive force and the first threshold value. A greater voltage difference may correspond to a greater first attractive force and a greater first threshold value.

Each of the first electrode and the second electrode may include an annular plate member. One of the first electrode and the second electrode may include a cylindrical member and the other of the first electrode and the second electrode includes a different diameter coaxial cylindrical member received within the cylindrical member. Each of the first electrode and the second electrode may include a frictional surface disposed on at least a portion thereof. The electrostatic clutch assembly may include a plurality of clutch settings, each clutch setting corresponds to a desired output operation of the power tool, and each clutch setting has the set torque. Each of the first electrode and the second electrode may include conductive material disposed on at least a portion thereof.

The conductive material may be disposed on surfaces of the first electrode and the second electrode that face each other. Each of the first electrode and the second electrode may include at least one conductive material layer. The at least one conductive material layer may be disposed on surfaces of the first electrode and the second electrode that face each other. The electrostatic clutch assembly may include positive and negative brushes that are stationary relative to the housing and are configured provide the electrical field to the first electrode and the second electrode.

The output shaft may be configured to drive a tool holder that is configured to receive a tool bit portion therein. The output shaft may have a first end portion and an opposing second end portion. One of the first end portion and the opposing second end portion may be operatively connected to the second electrode, and the other of the first end portion and the opposing second end portion may be operatively connected to the tool holder.

The first electrode may be operatively connected to the motor via an input shaft that is driven by a motor and transmission assembly. Each of the first electrode and the second electrode may include an annular member, a thrust bearing, and an electrostatic film member. The thrust bearing of each of the first electrode and the second electrode may be operatively connected to the associated annular member and the associated electrostatic film member. The annular members of the first electrode and the second electrode may be operatively connected to the motor and the output shaft, respectively.

Yet another aspect of the present patent application provides a power tool. The power tool comprises a housing, an output shaft, a motor, an electrostatic clutch assembly, and a controller. The electrostatic clutch assembly is disposed in the housing and includes a first electrode operatively connected to the motor and a second electrode operatively connected to the output shaft. The motor is disposed in the housing and is configured to provide a torque to the output shaft. The controller is disposed in the housing and is operatively cooperable with the electrostatic clutch assembly to operate in a fully disengaged mode wherein an electric field below a second predetermined threshold between the first electrode and the second electrode causes the output shaft to be rotationally decoupled from the motor, and in a clutch mode wherein an electric field between the first predetermined threshold and the second predetermined threshold is applied across the first electrode and the second electrode causing a second electrostatic force between the first electrode and the second electrode to rotationally couple the output shaft with the motor such that the output shaft moves together at the same velocity when the torque therebetween is below a set torque and to permit the motor to rotate at a higher velocity than the output shaft when the torque therebetween is above the set torque.

The controller may be disposed in the housing and is operatively cooperable with the electrostatic clutch assembly to operate in a fully engaged mode wherein an electric field above a first predetermined threshold is applied across the first electrode and the second electrode causing a first electrostatic force between the first electrode and the second electrode to rotationally couple the output shaft with the motor such that the output shaft and the motor move together at the same velocity. In one embodiment, when the electrostatic clutch assembly is in the fully disengaged mode, there is no electrostatic charge present between the first electrode and the second electrode of the electrostatic clutch assembly. In one embodiment, when the electrostatic clutch assembly is in the fully disengaged mode, the first electrode and the second electrode of the electrostatic clutch assembly are not attracted to each other. In one embodiment, when the electrostatic clutch assembly is in the fully disengaged mode, the first electrode and the second electrode of the electrostatic clutch assembly are positioned in such a way that a gap exists between surfaces of the first electrode and the second electrode that face each other. In one embodiment, when the electrostatic clutch assembly is in the clutch mode and when the torque between the output shaft and the motor is above the set torque, the velocity of the output shaft is zero. In one embodiment, when the electrostatic clutch assembly is in the fully engaged mode, the first electrode and the second electrode of the electrostatic clutch assembly are attracted to each other. In one embodiment, when the electrostatic clutch assembly is in the fully engaged mode, the first electrode and the second electrode of the electrostatic clutch assembly are positioned in such a way that no gap exists between surfaces of the first electrode and the second electrode that face each other. In one embodiment, when the electrostatic clutch assembly is in the clutch mode, the first electrode and the second electrode of the electrostatic clutch assembly are variably attracted to each other. In one embodiment, when the electrostatic clutch assembly is in the clutch mode, the first electrode and the second electrode of the electrostatic clutch assembly are positioned in such a way that no gap exists between surfaces of the first electrode and the second electrode that face each other. In one embodiment, the power tool further comprises a sensor configured to sense whether the electrostatic clutch assembly is in the fully engaged mode, the fully disengaged mode, or the clutch mode and output a signal to the controller. In one embodiment, the controller, in response to the received signal from the sensor, is configured to stop the rotation of the motor. The sensor may comprise one or more of a current sensor, a position sensor, and a rotational motion sensor. In one embodiment, each of the first electrode and the second electrode includes an annular plate member. In one embodiment, one of the first electrode and the second electrode includes a cylindrical member and the other of the first electrode and the second electrode includes a different diameter coaxial cylindrical member received within the cylindrical member.

In one embodiment, each of the first electrode and the second electrode includes a brake pad disposed on at least a portion thereof. In one embodiment, the electrostatic clutch assembly includes a plurality of clutch settings, each clutch setting corresponds to a desired output operation of the power tool, and each clutch setting has the set torque. In one embodiment, each of the first electrode and the second electrode includes conductive material disposed on at least a portion thereof. In one embodiment, the conductive material is disposed on surfaces of the first electrode and the second electrode that face each other. In one embodiment, each of the first electrode and the second electrode includes at least one conductive material layer. In one embodiment, the at least one conductive material layer is disposed on surfaces of the first electrode and the second electrode that face each other. In one embodiment, the electrostatic clutch assembly includes positive and negative brushes that are stationary relative to the housing and are configured provide the electrical field to the first electrode and the second electrode when the electrostatic clutch assembly is in either the fully engaged mode or the clutch mode. In one embodiment, the output shaft is configured to drive a tool holder that is configured to receive a tool bit portion therein. In one embodiment, the output shaft has a first end portion and an opposing second end portion. In one embodiment, one of the first end portion and the opposing second end portion is operatively connected to the second electrode, and the other of the first end portion and the opposing second end portion is operatively connected to the tool holder. In one embodiment, the first electrode is operatively connected to the motor via an input shaft that is driven by a motor and transmission assembly. In one embodiment, each of the first electrode and the second electrode includes an annular member, a thrust bearing, and an electrostatic film member. In one embodiment, the thrust bearing of each of the first electrode and the second electrode is operatively connected to the associated annular member and the associated electrostatic film member. In one embodiment, the annular members of the first electrode and the second electrode are operatively connected to the motor and the output shaft, respectively.

Yet another aspect of the present patent application provides an electrostatic clutch assembly for a power tool. The electrostatic clutch assembly may comprise an input member configured to be selectively driven in motion; an output member configured to selectively output a motion; a first electrode electrically couplable to an electrical power source; a second electrode electrically couplable to the electrical power source; a dielectric layer separating the first electrode from the second electrode; and a control circuit operatively cooperable with the first electrode from the second electrode to control electrical power delivery from the electrical power source to the first and second electrodes. In one embodiment, in a first mode of operation, the control circuit may cause a first voltage to be applied to the first electrode and a different second voltage to be applied to the second electrode, generating a first attractive force between the first and second electrodes, which causes the output member to rotate together with the input member when a torque on the output member is less than or equal to a first threshold value and which causes the output member to rotationally slip relative to the input member when the torque on the output member exceeds the first threshold value, interrupting torque transmission from the input member to the output member.

In one embodiment, the first threshold may correspond to the first attractive force. In one embodiment, in a second mode of operation, the control circuit may cause a third voltage to be applied to the first electrode and a different fourth voltage to be applied to the second electrode, generating a second attractive force between the first and second electrodes, which causes the output member to rotate together with the input member when a torque on the output member is less than or equal to a second threshold value and which causes the output member to rotationally slip relative to the input member when the torque on the output member exceeds the second threshold value, interrupting torque transmission from the input member to the output member.

In one embodiment, a second voltage difference between the third voltage and the fourth voltage is greater than a first voltage difference between the first voltage and the second voltage, the second attractive force may be greater than the first attractive force, and the second threshold value may be greater than the first threshold value. In one embodiment, the electrostatic clutch assembly may further comprise a selector switch actuatable by a user to select between the first and second modes of operation. In one embodiment, in a third mode of operation, the control circuit may cause a zero voltage difference to be applied to the first and second electrodes, allowing the second electrode to rotate relative to the first electrode and preventing torque transmission from the input member to the output member. In one embodiment, the control circuit may be configured to automatically switch from the first mode to the third mode upon sensing that the output member has rotationally slipped relative to the input member. In one embodiment, in a fourth mode of operation, the clutch assembly may be configured to prevent interruption of torque transmission from the input member to the output member.

In the fourth mode of operation, the control circuit may cause a fifth voltage to be applied to the first electrode and a different sixth voltage to be applied to the second electrode, generating a third attractive force between the first and second electrodes, the third attractive force exceeding a torque on the output member during operation of the power tool. The second voltage may have a polarity opposite a polarity of the first voltage. The first voltage difference may be user selectable to adjust the first attractive force and the first threshold value, and a greater voltage difference corresponds to a greater first attractive force and a greater first threshold value.

Each of the first electrode and the second electrode may include an annular plate member. One of the first electrode and the second electrode may include a cylindrical member and the other of the first electrode and the second electrode includes a different diameter coaxial cylindrical member received within the cylindrical member. Each of the first electrode and the second electrode may include a frictional surface disposed on at least a portion thereof.

The electrostatic clutch assembly may include a plurality of clutch settings, each clutch setting may correspond to a desired output operation of the power tool, and each clutch setting has the set torque. Each of the first electrode and the second electrode may include conductive material disposed on at least a portion thereof. The conductive material may be disposed on surfaces of the first electrode and the second electrode that face each other. Each of the first electrode and the second electrode may include at least one conductive material layer. The at least one conductive material layer may be disposed on surfaces of the first electrode and the second electrode that face each other. The electrostatic clutch assembly may include positive and negative brushes that are stationary relative to the housing and are configured provide the electrical field to the first electrode and the second electrode. The output member may be configured to drive a tool holder of the power tool that is configured to receive a tool bit portion therein. The output member may be a first end portion and an opposing second end portion. One of the first end portion and the opposing second end portion may be operatively connected to the second electrode. The other of the first end portion and the opposing second end portion may be operatively connected to the tool holder.

The first electrode may be operatively connected to a motor of the power tool via the input member that is driven by a motor and transmission assembly of the power tool. Each of the first electrode and the second electrode may include an annular member, a thrust bearing, and an electrostatic film member. The thrust bearing of each of the first electrode and the second electrode may be operatively connected to the associated annular member and the associated electrostatic film member. The annular members of the first electrode and the second electrode may be operatively connected to a motor of the power tool and the output member, respectively.

Yet another aspect of the present patent application provides an electrostatic clutch assembly for a power tool. The electrostatic clutch may comprise an input member configured to be selectively driven in motion; an output member configured to selectively output a motion; a first electrode electrically couplable to an electrical power source; a second electrode electrically couplable to an electrical power source; and a controller. The controller may be configured to operate: in a fully disengaged mode wherein an electric field below a second predetermined threshold between the first electrode and the second electrode causes the output member to be rotationally decoupled from the input member, and in a clutch mode wherein an electric field between the first predetermined threshold and the second predetermined threshold is applied across the first electrode and the second electrode causing a second electrostatic force between the first electrode and the second electrode to rotationally couple the output member with the input member such that the output member moves together at the same velocity when the torque therebetween is below a set torque and to permit the input member to rotate at a higher velocity than the output member when the torque therebetween is above the set torque.

In one embodiment, the controller may be configured to operate in a fully engaged mode wherein an electric field above a first predetermined threshold is applied across the first electrode and the second electrode causing a first electrostatic force between the first electrode and the second electrode to rotationally couple the output member with the input member such that the output member and the input member move together at the same velocity.

In one embodiment, when the electrostatic clutch assembly is in the fully disengaged mode, there may be no electrostatic charge present between the first electrode and the second electrode of the electrostatic clutch assembly. In one embodiment, when the electrostatic clutch assembly is in the fully disengaged mode, the first electrode and the second electrode of the electrostatic clutch assembly may not be attracted to each other. When the electrostatic clutch assembly is in the fully disengaged mode, the first electrode and the second electrode of the electrostatic clutch assembly may be positioned in such a way that a gap exists between surfaces of the first electrode and the second electrode that face each other. In one embodiment, when the electrostatic clutch assembly is in the clutch mode and when the torque between the output member and the input member is above the set torque, the velocity of the output member may be zero.

In one embodiment, when the electrostatic clutch assembly is in the fully engaged mode, the first electrode and the second electrode of the electrostatic clutch assembly may be attracted to each other. When the electrostatic clutch assembly is in the fully engaged mode, the first electrode and the second electrode of the electrostatic clutch assembly may be positioned in such a way that no gap exists between surfaces of the first electrode and the second electrode that face each other.

In one embodiment, when the electrostatic clutch assembly is in the clutch mode, the first electrode and the second electrode of the electrostatic clutch assembly are variably attracted to each other. In one embodiment, when the electrostatic clutch assembly is in the clutch mode, the first electrode and the second electrode of the electrostatic clutch assembly may be positioned in such a way that no gap exists between surfaces of the first electrode and the second electrode that face each other. In one embodiment, the electrostatic clutch assembly may further comprise a sensor configured to sense whether the electrostatic clutch assembly is in the fully engaged mode, the fully disengaged mode, or the clutch mode and output a signal to the controller. The controller, in response to the received signal from the sensor, may be configured to stop the rotation of a motor. The sensor may comprise one or more of a current sensor, a position sensor, and a rotational motion sensor.

In one embodiment, each of the first electrode and the second electrode may include an annular plate member. In one embodiment, one of the first electrode and the second electrode may include a cylindrical member and the other of the first electrode and the second electrode may include a different diameter coaxial cylindrical member received within the cylindrical member. In one embodiment, each of the first electrode and the second electrode may include a brake pad disposed on at least a portion thereof. In one embodiment, the electrostatic clutch assembly may include a plurality of clutch settings, each clutch setting corresponds to a desired output operation of a power tool, and each clutch setting has the set torque.

In one embodiment, each of the first electrode and the second electrode may include conductive material disposed on at least a portion thereof. In one embodiment, the conductive material may be disposed on surfaces of the first electrode and the second electrode that face each other.

In one embodiment, each of the first electrode and the second electrode may include at least one conductive material layer. In one embodiment, the at least one conductive material layer may be disposed on surfaces of the first electrode and the second electrode that face each other. In one embodiment, the electrostatic clutch assembly may include positive and negative brushes that are stationary relative to the housing and are configured provide the electrical field to the first electrode and the second electrode when the electrostatic clutch assembly is in either the fully engaged mode or the clutch mode.

In one embodiment, the output member may be configured to drive a tool holder of the power tool that is configured to receive a tool bit portion therein. The output member may have a first end portion and an opposing second end portion. The one of the first end portion and the opposing second end portion may be operatively connected to the second electrode. The other of the first end portion and the opposing second end portion may be operatively connected to the tool holder.

In one embodiment, the first electrode may be operatively connected to a motor of the power tool via the input member that is driven by a motor and transmission assembly of the power tool. In one embodiment, each of the first electrode and the second electrode may include an annular member, a thrust bearing, and an electrostatic film member. The thrust bearing of each of the first electrode and the second electrode may be operatively connected to the associated annular member and the associated electrostatic film member. The annular members of the first electrode and the second electrode may be operatively connected to the input member and the output member, respectively.

Yet another aspect of the present patent application provides a power tool. The power tool may comprise a housing configured to be coupled to an electrical power source; a motor received in the housing; an end effector coupled to the housing and configured to perform an operation on a workpiece; an electrostatic clutch assembly disposed in the housing between the motor and the end effector. The electrostatic clutch assembly may include an input member configured to be selectively driven by the motor; an output member configured to selectively output to the end effector; at least one frictional surface; a first electrode electrically couplable to the electrical power source; a second electrode electrically couplable to the electrical power source; and a dielectric layer separating the first electrode from the second electrode. The power tool may further comprise a control circuit operatively cooperable with the first and second electrodes to control electrical power delivery from the electrical power source to the first and second electrodes. In one embodiment, in a first mode of operation, the control circuit may cause a first voltage to be applied across the first electrode and a different second voltage to be applied to the second electrode, generating a first attractive force between the first and second electrodes, which causes the frictional surface to frictionally engage with at least one of the input member and the output member to enable motion to be transmitted from the input member to the output member.

In one embodiment, in the first mode of operation, motion from the input member to the output member may be interrupted when a force applied to the output member is greater than a first threshold value. In one embodiment, the first threshold value may correspond to a frictional force between the frictional surface and at least one of the input member and the output member. In one embodiment, in a second mode of operation, the control circuit may cause a third voltage to be applied to the first electrode and a different fourth voltage to be applied to the second electrode, generating a second attractive force between the first and second electrodes, which causes the frictional surface to frictionally engage with at least one of the input member and the output member to enable motion to be transmitted from the input member to the output member when a force applied to the output member is less than or equal to a second threshold value and to interrupt force transmission from the input member to the output member when the force applied to the output member is greater than the second threshold value.

In one embodiment, the third voltage may be greater than the first voltage, the fourth voltage may be greater than the second voltage, the second attractive force may be greater than the first attractive force, and the second threshold value may be greater than the first threshold value. In one embodiment, the power tool may further comprise a selector switch coupled to the housing that is actuatable by a user to select between the first and second modes of operation. In one embodiment, in a third mode of operation, the control circuit may cause zero voltage to be applied to the first and second electrodes, preventing motion from being transmitted from the input member to the output member. In one embodiment, the control circuit may be configured to automatically switch from the first mode to the third mode upon sensing that the motion transmission from the input member to the output member has been interrupted.

Each of the first electrode and the second electrode may include an annular plate member. One of the first electrode and the second electrode may include a cylindrical member and the other of the first electrode and the second electrode includes a different diameter coaxial cylindrical member received within the cylindrical member.

Each of the first electrode and the second electrode may include a frictional surface disposed on at least a portion thereof. The electrostatic clutch assembly may include a plurality of clutch settings, each clutch setting may correspond to a desired output operation of the power tool, and each clutch setting has the set torque. Each of the first electrode and the second electrode may include conductive material disposed on at least a portion thereof. The conductive material may be disposed on surfaces of the first electrode and the second electrode that face each other.

Each of the first electrode and the second electrode may include at least one conductive material layer. The at least one conductive material layer may be disposed on surfaces of the first electrode and the second electrode that face each other. The electrostatic clutch assembly may include positive and negative brushes that are stationary relative to the housing and are configured provide the electrical field to the first electrode and the second electrode.

The output shaft may be configured to drive a tool holder of the power tool that is configured to receive a tool bit portion therein. The output shaft may have a first end portion and an opposing second end portion. One of the first end portion and the opposing second end portion may be operatively connected to the second electrode. The other of the first end portion and the opposing second end portion may be operatively connected to the tool holder.

The first electrode may be operatively connected to the motor of the power tool via an input shaft that is driven by a motor and transmission assembly of the power tool. Each of the first electrode and the second electrode may include an annular member, a thrust bearing, and an electrostatic film member. The thrust bearing of each of the first electrode and the second electrode may be operatively connected to the associated annular member and the associated electrostatic film member. The annular members of the first electrode and the second electrode may be operatively connected to the motor and the output shaft, respectively.

Another aspect of the present patent application provides an electrostatic clutch assembly for a power tool. The electrostatic clutch assembly includes an input member, an output member, at least one frictional surface, a first electrode, a second electrode, a dielectric layer, and a control circuit. The input member is configured to be selectively driven in motion. The output member is configured to selectively output a motion. The first electrode is electrically couplable to the electrical power source. The second electrode is electrically couplable to the electrical power source. The dielectric layer is separating the first electrode from the second electrode. The control circuit is operatively cooperable with the first and second electrodes to control electrical power delivery from the electrical power source to the first and second electrodes. In a first mode of operation, the control circuit causes a first voltage to be applied to the first electrode and a different second voltage to be applied to the second electrode, generating a first attractive force between the first and second electrodes, which causes the frictional surface to frictionally engage with at least one of the input member and the output member to enable motion to be transmitted from the input member to the output member.

In one embodiment, in the first mode of operation, motion from the input member to the output member is interrupted when a force applied to the output member is greater than a first threshold value. In one embodiment, the first threshold value corresponds to a frictional force between the frictional surface and at least one of the input member and the output member. In one embodiment, in a second mode of operation, the control circuit causes a third voltage to be applied to the first electrode and a different fourth voltage to be applied to the second electrode, generating a second attractive force between the first and second electrodes, which causes the frictional surface to frictionally engage with at least one of the input member and the output member to enable motion to be transmitted from the input member to the output member when a force applied to the output member is less than or equal to a second threshold value and to interrupt force transmission from the input member to the output member when the force applied to the output member is greater than the second threshold value. In one embodiment, the third voltage is greater than the first voltage, the fourth voltage is greater than the second voltage, the second attractive force is greater than the first attractive force, and the second threshold value is greater than the first threshold value. In one embodiment, the power tool further comprises a selector switch actuatable by a user to select between the first and second modes of operation. In one embodiment, in a third mode of operation, the control circuit causes zero voltage to be applied to the first and second electrodes, preventing motion from being transmitted from the input member to the output member. In one embodiment, the control circuit is configured to automatically switch from the first mode to the third mode upon sensing that the motion transmission from the input member to the output member has been interrupted.

Each of the first electrode and the second electrode may include an annular plate member. One of the first electrode and the second electrode may include a cylindrical member and the other of the first electrode and the second electrode includes a different diameter coaxial cylindrical member received within the cylindrical member. Each of the first electrode and the second electrode may include a frictional surface disposed on at least a portion thereof.

The electrostatic clutch assembly may include a plurality of clutch settings, each clutch setting may correspond to a desired output operation of the power tool, and each clutch setting has the set torque. Each of the first electrode and the second electrode may include conductive material disposed on at least a portion thereof. The conductive material may be disposed on surfaces of the first electrode and the second electrode that face each other. Each of the first electrode and the second electrode may include at least one conductive material layer. The at least one conductive material layer may be disposed on surfaces of the first electrode and the second electrode that face each other.

The electrostatic clutch assembly may include positive and negative brushes that are stationary relative to the housing and are configured provide the electrical field to the first electrode and the second electrode.

The output shaft may be configured to drive a tool holder of the power tool that is configured to receive a tool bit portion therein. The output shaft may have a first end portion and an opposing second end portion. One of the first end portion and the opposing second end portion may be operatively connected to the second electrode, and wherein the other of the first end portion and the opposing second end portion is operatively connected to the tool holder. The first electrode may be operatively connected to the motor of the power tool via an input shaft that is driven by a motor and transmission assembly of the power tool.

Each of the first electrode and the second electrode may include an annular member, a thrust bearing, and an electrostatic film member. The thrust bearing of each of the first electrode and the second electrode may be operatively connected to the associated annular member and the associated electrostatic film member. The annular members of the first electrode and the second electrode may be operatively connected to the motor and the output shaft, respectively.

These and other aspects of the present patent application, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the present patent application, the structural components illustrated herein are drawn to scale. It is to be expressly understood, however, that the drawings are for the purpose of illustration and description only and are not intended as a definition of the limits of the present patent application. It shall also be appreciated that the features of one embodiment disclosed herein can be used in other embodiments disclosed herein. As used in the specification and in the claims, the singular form of "a", "an", and "the" include plural referents unless the context clearly dictates otherwise.

14

Figure 17:
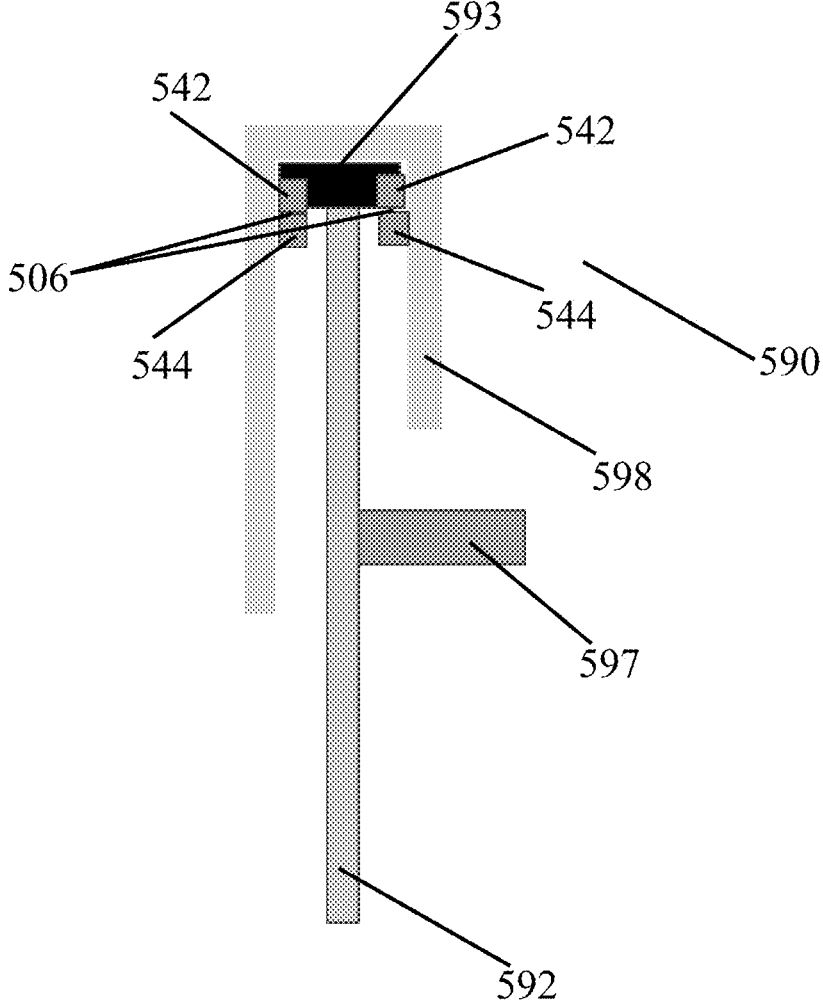

FIG. 17 shows a power tool system that includes a saw braking mechanism having the electrostatic mechanism according to an embodiment of the present patent application.

DETAILED DESCRIPTION

In one embodiment, the present patent application provides electrostatic clutches or electro-mechanical electrostatic clutches for power tools. In one embodiment, the present patent application provides electroadhesive clutches or electro-mechanical electroadhesive clutches for power tools. In one embodiment, the present patent application provides electrostatic clutches, electro-mechanical electrostatic clutches, electroadhesive clutches, or electro-mechanical electroadhesive clutches for other power devices.

In one embodiment, referring to FIGS. 2-5 and 13, the present patent application provides a power tool 10. The power tool 10 includes a housing 12, a motor and transmission assembly 14, an end effector 22, an electrostatic clutch assembly 18, and a control circuit 50. The housing 12 is configured to be coupled to an electrical power source 102. The motor and transmission assembly 14 is received in the housing 12. The end effector 22 is coupled to the housing 12 and is configured to perform an operation on a workpiece (not shown). The electrostatic clutch assembly 18 is disposed in the housing 12 between the motor and transmission assembly 14 and the end effector 22. The electrostatic clutch assembly 18 includes an input member 66 configured to be rotationally driven by the motor and transmission assembly 14, an output member 68 configured to rotationally drive the end effector 22, a first electrode 42 electrically couplable to the electrical power source 102, a second electrode 44 electrically couplable to the electrical power source 102, and a dielectric layer 106 separating the first electrode 42 and the second electrode 44. In one embodiment, the motor and transmission assembly 14 may include a motor 15 and a transmission 16. In another embodiment, the motor and transmission assembly 14 may include the motor 15.

In one embodiment, as shown and described in detail below with respect to the embodiments of FIGS. 2-6, the present patent application provides the electrostatic clutch assembly 18 for the power tool 10 that is configured to slip or rotate at a torque level while the charge is still applied to the electrostatic film/layers 60 of the first and second electrodes 42, 44, especially where there are multiple clutch settings that correspond to different torque levels and charge amounts. In one embodiment, as shown and described in detail below with respect to the embodiments of FIGS. 7-9B and 12A-C, the power tool system 200 or 400 also uses frictional elements/brake pad(s) 262/462 along with the electrostatic film/layers 260/460 of the first and second electrodes 242, 244 or 442, 444 as part of the electrostatic clutch assembly 218/418. In one embodiment, as shown and described with respect to the embodiments of FIGS. 10-11, the power tool system 300 also may use thrust bearing(s) 364 along with the electrostatic film/layers 360 of the first and second electrodes 342, 344 as part of the electrostatic clutch assembly 318. In one embodiment, as shown and described in detail with respect to the embodiments of FIGS. 14-17, the present patent application further uses this electrostatic technology/mechanism to quickly stop/brake a spinning object upon a detected event.

In the first embodiment of FIGS. 2-5 and 13, the control circuit 50 is disposed in the housing 12 and is operatively cooperable with the motor and transmission assembly 14 and the electrostatic clutch assembly 18 to control electrical power delivery from the electrical power source 102 to the motor and transmission assembly 14 and to the first and second electrodes 42, 44. In a first mode of operation, the control circuit 50 causes a voltage difference to be applied across the first and second electrodes 42, 44, generating a first attractive force between the first and second electrodes 42, 44. For example, a first voltage may be applied to the first electrode 42 and a second voltage with a polarity opposite a polarity the first voltage may be applied to the second electrode 44, generating a first attractive force between the first and second electrodes 42, 44. That is, in the first mode of operation, the control circuit 50 may cause the first voltage to be applied to the first electrode 42 and a different second voltage to be applied to the second electrode 44. This causes the output member 68 to rotate together with the input member 66 when a torque on the output member 68 is less than or equal to a first threshold value and which allows the output member 68 to rotationally slip or rotate relative to the input member 66 when the torque on the output member 68 exceeds the first threshold value, interrupting torque transmission from the input member 66 to the output member 68.

In one embodiment, the electrostatic clutch 18 of FIGS. 2-6 and 13 (and also electrostatic clutch 218 in FIGS. 7-9B, electrostatic clutch 318 in FIGS. 10-11, electrostatic clutch 418 in FIGS. 12A-12C, and electrostatic clutch 518 in FIGS. 14-17) of the present patent application may employ the clutches disclosed in U.S. Pat. Nos. 10,355,624; 10,554,154; and 10,749,450. and U.S. Patent Application Publication No. 2020/0177109, each of which is incorporated by reference in their entirety herein. In one embodiment, the electrostatic clutches 18, 218, 318, 418, or 518 of the present patent application employ the clutches described in Stuart B Diller, Steven H Collins, and Carmel Majidi. (2018). The effects of electroadhesive clutch design parameters on performance characteristics. *Journal of Intelligent Material Systems and Structures*, Vol. 29(19), 3804-3828, which is incorporated by reference in its entirety.

Figure 2:
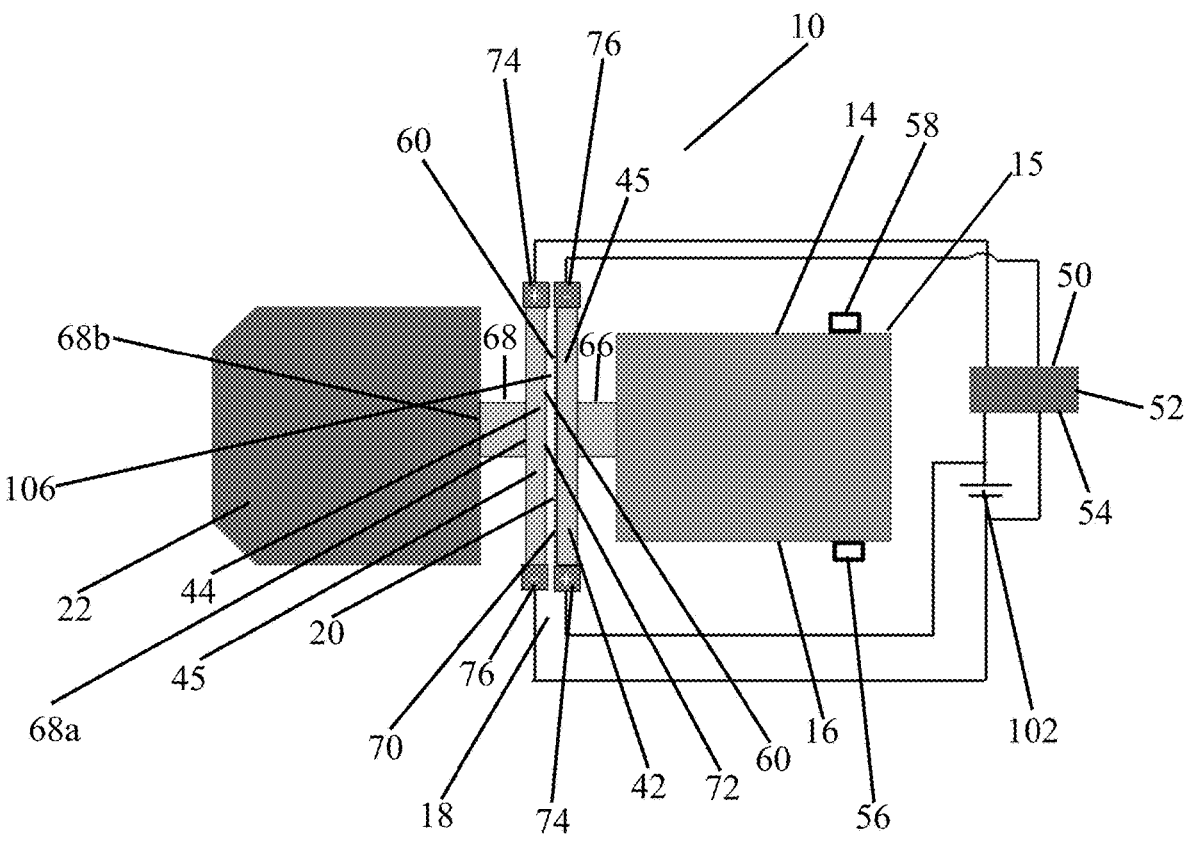
FIG. 2 shows a power tool system having an electrostatic clutch according to various embodiments of the present patent application.
Figure 2A:
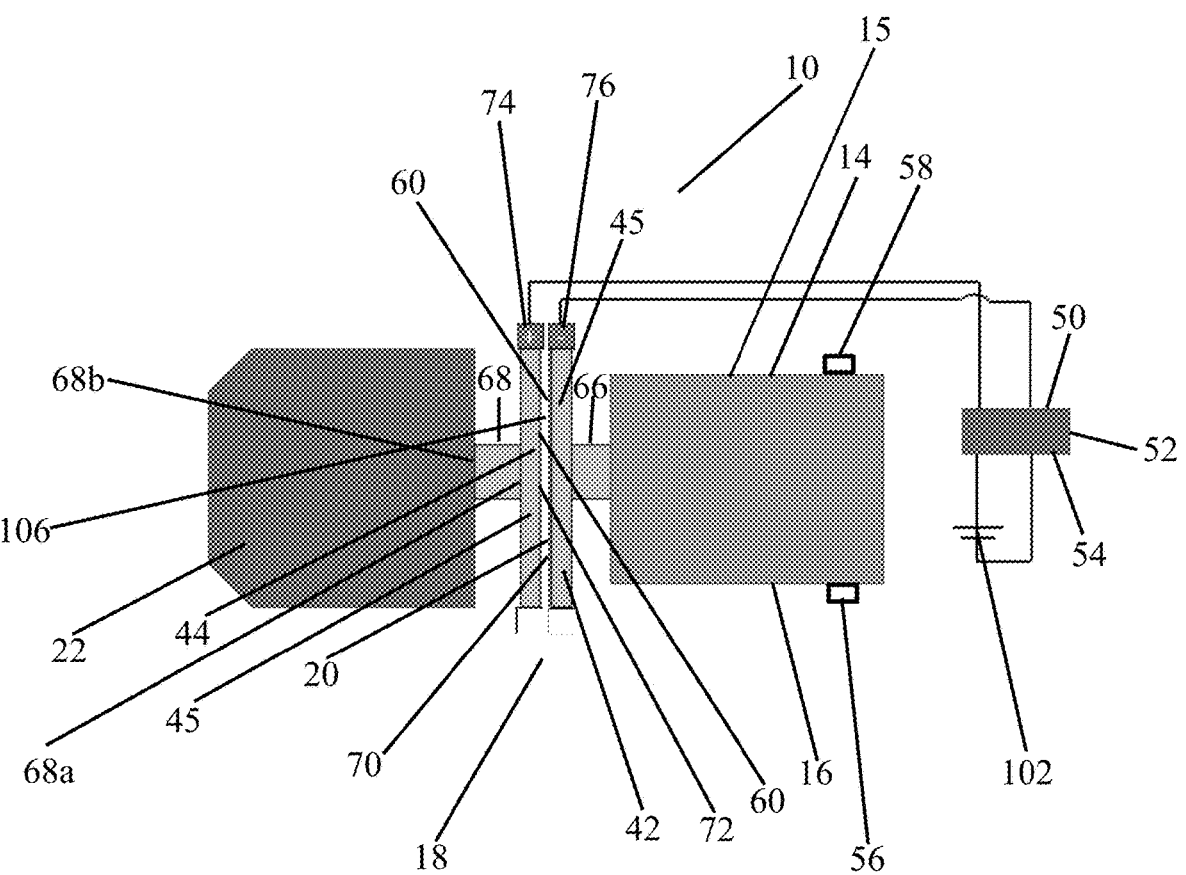
FIG. 2A shows the power tool system of FIG. 2 according to an embodiment of the present patent application.
Figure 2B:
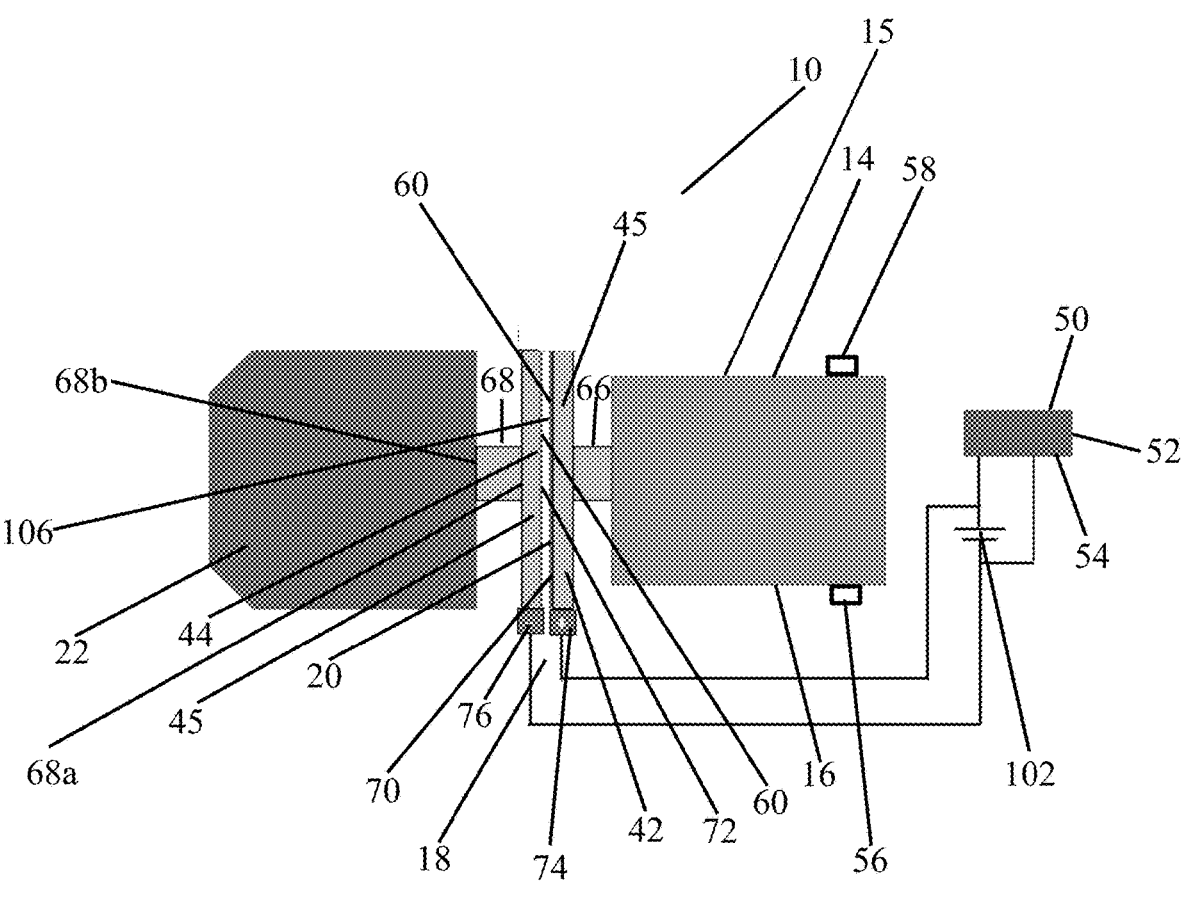
FIG. 2B shows the power tool system of FIG. 2 according to another embodiment of the present patent application.

FIG. 2 illustrates two superimposed versions of the electrostatic clutch assembly 18. For ease of understanding and sake of clarity, these two embodiments of the electrostatic clutch assembly 18 in FIG. 2 are shown separately in FIGS. 2A and 2B. Other than these differences noted below, the operation and the configuration of the electrostatic clutch assembly 18 in FIG. 2 are same as those of the electrostatic clutch assemblies 18 in FIGS. 2A and 2B. Specifically, FIG. 2A shows operational connections between the control circuit 50, the electrical power source 102 and the first and second electrodes 42, 44 in accordance with an embodiment of the present patent application. FIG. 2B shows different operational connections between the control circuit 50, the electrical power source 102 and the first and second electrodes 42, 44 in accordance with another embodiment of the present patent application.

These operational connections of FIGS. 2A and 2B may be configured to enable the control circuit 50, disposed in the housing 12 and operatively cooperable with the electrostatic clutch assembly 18, to control electrical power delivery from the electrical power source 102 to the first and second electrodes 42, 44, which in turn enables one of the first and second electrodes 42, 44 to be a positively charged electrode and the other of the first and second electrodes 42, 44 to be a negatively charged electrode. One of the first and second electrodes 42, 44 may be positively charged when a first voltage is applied to one of the first and second electrodes 42, 44 and the other of the first and second electrodes 42, 44 may be negatively charged when a second voltage with a polarity opposite a polarity the first voltage may be applied to the other of the first and second electrodes 42, 44. In one embodiment, the first and second electrodes 42, 44 of the electrostatic clutch assembly 18 comprise a parallel-plate capacitor (i.e., two conducting plates 42, 44, with a dielectric therebetween). The plates are oppositely charged, as with any capacitor.

Like FIG. 2, each of FIGS. 7, 10, 11 and 12C presents, for sake of brevity, a superimposed figure with two embodiments of the electrostatic clutch assembly. Each of these two embodiments in FIGS. 7, 10, 11 and 12C has different operational connections between the control circuit, the electrical power source and the first and second electrodes. A person of ordinary skill in the art would readily appreciate that each of these two embodiments in FIGS. 7, 10, 11 and 12C may be presented separately or individually, for example, as shown in FIGS. 2A and 2B.

In one embodiment, the output member 68 may be interchangeably referred to as output shaft 68. In one embodiment, the control circuit 50 may be interchangeably referred to as controller 50. In one embodiment, the end effector 22 may be interchangeably referred to as chuck or tool holder 22.

In one embodiment, the controller 50 is operatively cooperable with the motor and transmission assembly 14 and the electrostatic clutch assembly 18 to operate: (1) in a fully engaged mode wherein an electric field above a first predetermined threshold is applied across the first electrode 42 and the second electrode 44 causing a first electrostatic force between the first electrode 42 and the second electrode 44 to rotationally couple the output member 68 with the input member 66 and the motor and transmission assembly 14 such that the output shaft 68 and the motor and transmission assembly 14/input member 66 rotate together at the same velocity; (2) in a fully disengaged mode wherein an electric field below a second predetermined threshold between the first electrode 42 and the second electrode 44 causes the output member 68 to be rotationally decoupled from the input member 66/motor and transmission assembly 14, and/or (3) in a clutch mode wherein an electric field between the first predetermined threshold and the second predetermined threshold is applied across the first electrode 42 and the second electrode 44 causing a second electrostatic force between the first electrode 42 and the second electrode 44 to rotationally couple the output member 68 with the motor and transmission assembly 14/input member 66 such that the output member 68 rotates together at the same velocity when the torque therebetween is below a set torque and to decouple the output member 68 from the input member 66 so that the output member 68 can rotate at a lower or zero velocity while the motor and transmission assembly 14 continues to rotate at a higher velocity when the torque therebetween is above the set torque.

Figure 13:
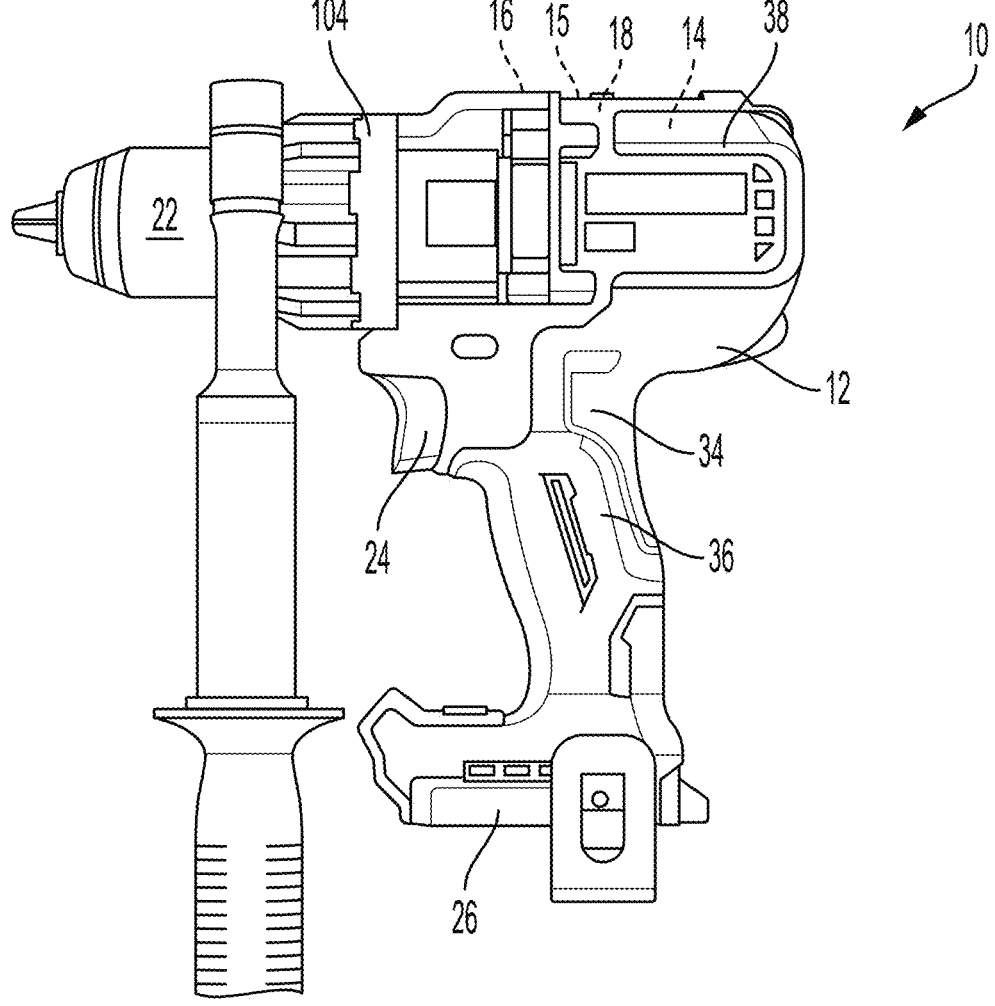
FIG. 13 shows an exemplary power tool that includes the electrostatic clutch according to an embodiment of the present patent application.

FIG. 13 shows an exemplary power tool 10 constructed in accordance with the teachings of the present patent application. As those skilled in the art will appreciate, embodiments may include either a corded or cordless (battery operated) power tool/device. In one embodiment, the power tool is a power screwdriver, a power fastener/fastening tool, a power driver, a power drill, a power expansion tool, and/or other power tools. In illustrated embodiment of FIG. 13, the power tool 10 is a power (cordless) drill/screwdriver. In one embodiment, the power tool 10 is a portable device.

In one embodiment, the power tool 10 generally includes the housing 12, the motor and transmission assembly 14 (which includes the motor 15 and a transmission 16, such as a multi-speed transmission assembly 16), the electrostatic clutch/electrostatic clutch assembly 18, the output shaft/ output spindle assembly 68, the tool holder/chuck 22, a trigger assembly 24 and a battery pack 26. Those skilled in the art will understand that several of the components of the power tool 10, such as the tool holder 22, the trigger assembly 24 and the battery pack 26, are conventional in nature and therefore need not be discussed in significant detail in the present patent application. Reference may be made to a variety of patents/patent publications for a more complete understanding of the conventional features of the power tool 10. One example of such patents is U.S. Pat. No. 5,897,454 issued Apr. 27, 1999, which is hereby incorporated by reference in the present patent application in its entirety.

Referring to FIG. 13, the housing 12 includes a pair of mating handle shells 34 that cooperate to define a handle portion 36 and a drive train or body portion 38. In one embodiment, the body portion 38 includes a motor receiving portion and a transmission receiving portion. In one embodiment, the housing 12 is configured to be coupled to the electrical power source 102. In one embodiment, the electrical power source 102 includes a battery pack or an AC power source as described in detail below.

In one embodiment, the output shaft 68 is proximate to the front end of the housing 12 and is coupled to the tool holder 22 for holding a power tool accessory. In one embodiment, the power tool accessory includes a tool bit such as a drill bit, an expansion bit, a screwdriver bit and/or other tool bits. In one embodiment, the tool holder 22 is a keyless chuck, although it should be understood that the tool holder can have other tool holder configurations such as a quick release tool holder, a hex tool holder, or a keyed tool holder/chuck. In one embodiment, the end effector 22 is coupled to the housing 12 and is configured to perform an operation on a workpiece (not shown).

In one embodiment, as shown in FIG. 2, the output shaft 68 is configured to rotationally drive the tool holder 22 that is configured to receive the tool bit portion therein. In one embodiment, the output shaft 68 has a first end portion 68a and an opposing second end portion 68b. In one embodiment, one of the first end portion 68a and the opposing second end 68b portion is operatively connected to the second electrode 44, and wherein the other of the first end portion 68a and the opposing second end portion 68b is operatively connected to the tool holder 22.

In one embodiment, the trigger assembly 24 and the battery pack 26 are mechanically coupled to the handle portion 36 and are electrically coupled to the motor and transmission assembly 14 in a conventional manner that is not specifically shown but which is readily understood by and within the capabilities of one having an ordinary level of skill in the art. In one embodiment, the power tool 10 includes other sources of power (e.g., alternating current (AC) power cord or compressed air source) coupled to a distal end of the handle portion 36. In one embodiment, the trigger assembly 24 is a variable speed trigger. In one embodiment, the trigger assembly 24 is configured to be coupled to the housing 12 for selectively actuating and controlling the speed of the motor 15, for example, by controlling a pulse width modulation (PWM) signal delivered to the motor 15.

In one embodiment, the motor 15 is disposed/received in the housing 12 and is configured to provide a torque to the input shaft 66 via the transmission assembly 16. In one embodiment, the motor 15 is a brushless or electronically commutated motor, although the motor 15 may be another type of brushed DC motor or universal motor.

The motor 15 is housed in the motor receiving portion and includes a rotatable output motor shaft, which extends into the transmission receiving portion. In one embodiment, a motor pinion having a plurality of gear teeth is coupled for rotation with the rotatable output motor shaft. The trigger assembly 24 and battery pack 26 cooperate to selectively provide electric power to the motor and transmission assembly 14 in a manner that is generally well known in the art so as to permit the user of the power tool 10 to control the speed and direction with which the rotatable output motor shaft rotates.

In one embodiment, a motor output shaft extends from the motor 15 to the transmission 16, which transmits power from the motor output shaft to the input member 66, which transmits power to the output shaft 68 and to the tool holder 22.

In one embodiment, the transmission assembly 16 comprises a multi-speed transmission having a plurality of gears and settings that allow the speed reduction through the transmission 16 to be changed, in a manner well understood to one of ordinary skill in the art. In one embodiment, the transmission assembly 16 comprises a multi-stage planetary gear set, with each stage having an input sun gear, a plurality of planet gears meshed with the sun gears and pinned to a rotatable planet carrier, and a ring gear meshed with and surrounding the planet gears. For each stage, if a ring gear is rotationally fixed relative to the housing 12, the planet gears orbit the sun gear when the sun gear rotates, transferring power at a reduced speed to their planet carrier, thus causing a speed reduction through that stage. If a ring gear is allowed to rotate relative to the housing 12, then the sun gear causes the planet carrier to rotate at the same speed as the sun gear, causing no speed reduction through that stage. By varying which one or ones of the stages have the ring gears are fixed against rotation, one can control the total amount of speed reduction through the transmission 16, and thus adjust the speed setting of the transmission 16 (e.g., among high, medium, and low). In the illustrated embodiment, this adjustment of the speed setting is achieved via a shift ring that surrounds the ring gears and that is shiftable along the axis of the output shaft to lock different stages of the ring gears against rotation. In one embodiment, the power tool 10 includes a speed selector switch for selecting the speed reduction setting of the transmission. A speed selector switch is coupled to the shift ring by spring biased pins so that axial movement of the speed selector switch causes the axial movement of the shift ring. Further details regarding an exemplary multi-speed transmission is described in U.S. Pat. No. 7,452,304 which is incorporated by reference in the present patent application in its entirety. It should be understood that other types of multi-speed transmissions and other mechanisms for shifting the transmission among the speeds is within the scope of the present patent application.

In one embodiment, the power tool 10 includes the controller/control circuit 50. In one embodiment, the control circuit 50 is disposed in the housing 12 and is operatively cooperable with the motor and transmission assembly 14 and the electrostatic clutch assembly 18 to control electrical power delivery from the electrical power source 102 to the motor and transmission assembly 14 and to the first and second electrodes 42, 44.

In one embodiment, the controller 50 is disposed in the housing 12 and is operatively cooperable with the motor and transmission assembly 14 and the electrostatic clutch assembly 18 to operate in the fully engaged mode, the fully disengaged mode, and the clutch mode.

In one embodiment, the controller 50 is further defined as a microcontroller. In other embodiments, controller refer to, be part of, or include an electronic circuit, an Application Specific Integrated Circuit (ASIC), a processor (shared, dedicated, or group) and/or memory (shared, dedicated, or group) that execute one or more software or firmware programs, a combinational logic circuit, and/or other suitable components that provide the described functionality.

In one embodiment, the controller 50 includes a current sensing circuit 52, and a position sensing circuit 54. In one embodiment, the current sensing circuit 52 includes a current sensor 56 (e.g., a shunt resistor) that senses the amount of current being delivered to the motor 15 and provides a current sensing signal corresponding to the sensed current to the controller 50. In one embodiment, the position/rotation sensing circuit 54 includes one or more position/rotation sensors 58 that sense changes in the angular position of the motor output shaft and provides a signal corresponding to the angular rotation, speed, and/or acceleration of the motor 15 to the controller 50. In one embodiment, the position sensors are Hall sensors that are already part of a brushless motor. For example, the power tool 10 may include a three-phase brushless motor, where the rotor includes a four-pole magnet, and there are three Hall sensors positioned at 120° intervals around the circumference of the rotor. As the rotor rotates, each Hall sensor senses when one of the poles of the four-pole magnet passes over the Hall sensor. Thus, the Hall sensors can sense each time the rotor, and thus the motor output shaft, rotates by an increment of 60°. In one embodiment, the rotation sensing circuit can use the signals from the Hall sensors to infer or calculate the amount of angular rotation, speed, and/or acceleration of the rotor. For example, the rotation sensing circuit includes a clock or counter that counts the amount of time or the number of counts between each 60° rotation of the rotor. The controller 50 can use this information to calculate or infer the amount of angular rotation, speed, and/or acceleration of the motor 15. In one embodiment, the current sensing circuit 52, the current sensor 56, the position/rotation sensing circuit 54, and the position/rotation sensors 58 are optional.

—In one embodiment, the electrostatic clutch assembly 18 is disposed in the housing 12. In one embodiment, the electrostatic clutch assembly 18 is disposed in the housing 12 between the motor and transmission assembly 14 and the end effector 22.

In one embodiment, the electrostatic clutch assembly 18 includes the first electrode 42 operatively connected to the motor and transmission assembly 14 and the second electrode 44 operatively connected to the output shaft 68.

In one embodiment, the electrostatic clutch assembly 18 includes the input member 66 configured to be rotationally driven by the motor and transmission assembly 14, the output member 68 configured to rotationally drive the end effector 22, the first electrode 42 electrically couplable to the electrical power source 102, the second electrode 44 electrically couplable to the electrical power source 102, and the dielectric layer 106 separating the first electrode 42 from the second electrode 44.

In one embodiment, the first electrode 42 is operatively connected to the motor and transmission assembly 14 via the input member/shaft 66. In one embodiment, the first electrode 42 is operatively connected to the motor 15 via the input shaft 66 that is driven by the motor and transmission assembly 14.

In one embodiment, the second electrode 44 is operatively connected to the output shaft 68. In one embodiment, the first electrode/rotating input electrode 42 is coupled to the rotating input shaft 66 that is driven by the transmission 16 and the second electrode/the rotating output electrode 44 is coupled to the rotating output shaft 68 that drives the output tool holder/chuck 22.

Each of the facing surfaces 70, 72 of the input electrode 42 and the output electrode 44 are coated with the electrostatic layer/film 60. In one embodiment, each of the first electrode 42 and the second electrode 44 includes conductive material disposed on at least a portion thereof. In one embodiment, the conductive material is disposed beneath surfaces 70, 72 of the first electrode 42 and the second electrode 44 that face each other.

In one embodiment, each of the first electrode 42 and the second electrode 44 includes at least one conductive material layer. In one embodiment, at least one conductive material layer is disposed on surfaces of the first electrode 42 and the second electrode 44 that face each other. In one embodiment, the electrostatic clutch 18 is composed of a plurality of layers of electrostatic film 60 that are layered on top of one another for greater holding force.

In one embodiment, each of the first electrode 42 and the second electrode 44 includes a substrate 45 and an electrostatic layer/coating/film 60 deposited thereon. In one embodiment, each of the electrodes 42, 44 and/or the electrostatic layer/coating/film 60 comprise a lightweight conductive material, such as aluminum-sputtered biaxially-oriented polyethylene terephthalate.

In one embodiment, the electrode 42, 44 is comprised of aluminum-sputtered BOPET (Bi-axially Oriented Polyethylene Terephthalate) film, also known as Mylar® film. The aluminum deposition acts as the conductive layer 60 and the BOPET acts as the substrate 45. Aluminum-sputtered BOPET films of this type can have a thickness of around 25 microns. Despite the thin profile, the material is sufficiently strong to act as a force transmission component. In addition, very little electrode material is required to hold a charge, making thin and lightweight electrodes 42, 44 possible. In alternative embodiments, a single-layer, conductive electrode, such as a metallic foil, is used.

In one embodiment, with a pair of electrodes, at least one electrode 42, 44 is covered in a dielectric material/layer 106 to maintain the gap between the conductive surfaces of the electrodes 42, 44. In one embodiment, the two electrostatic films 60 are always separated by the dielectric layer 106. In one embodiment, the dielectric layer is very thin and has dimension in the order of microns.

In one embodiment, the dielectric layer 106 is an air gap between the two electrostatic films 60. In one embodiment, if the dielectric layer 106 is an air gap, then there may be a slightly larger air gap when the electrodes 42, 44 are not energized and a smaller air gap when the electrodes 42, 44 are energized.

In one embodiment, the dielectric layer 106 is a layer of dielectric material. In one embodiment, if the dielectric layer is a layer of material 106, the dielectric layer of material 106 is layered over one or both of the electrodes 42, 44.

For example, in one embodiment, when the electrodes 42, 44 are energized, the dielectric layer 106 of one electrode 42, 44 is configured to touch the other electrode 42, 44. In one embodiment, when the electrodes 42, 44 are energized, the dielectric layer 106 of one electrode 42, 44 is configured to touch the dielectric layer 106 of the other electrode 42, 44.

In one embodiment, when the electrodes 42, 44 are deenergized, there may be an air gap between the dielectric layer 106 on one electrode 42, 44 and the other electrode 42, 44. In one embodiment, when the electrodes 42, 44 are deenergized, there may be an air gap between the dielectric layer 106 on one electrode 42, 44 and the dielectric layer 106 on the other electrode 42, 44.

In one embodiment, as shown in FIGS. 2-11, the electrodes 42, 44 are generally planar. In one embodiment, as shown in FIGS. 2-11, the electrodes 42, 44 generally have annular plate/disc shaped configurations. In one embodiment, as shown in FIGS. 2-11, each of the first electrode 42 and the second electrode 44 includes an annular plate member. The first electrode 42 and the second electrode 44 may interchangeably be referred to as input electrode/disc/plate and output electrode/disc/plate, respectively.

Figures 12A, 12B:
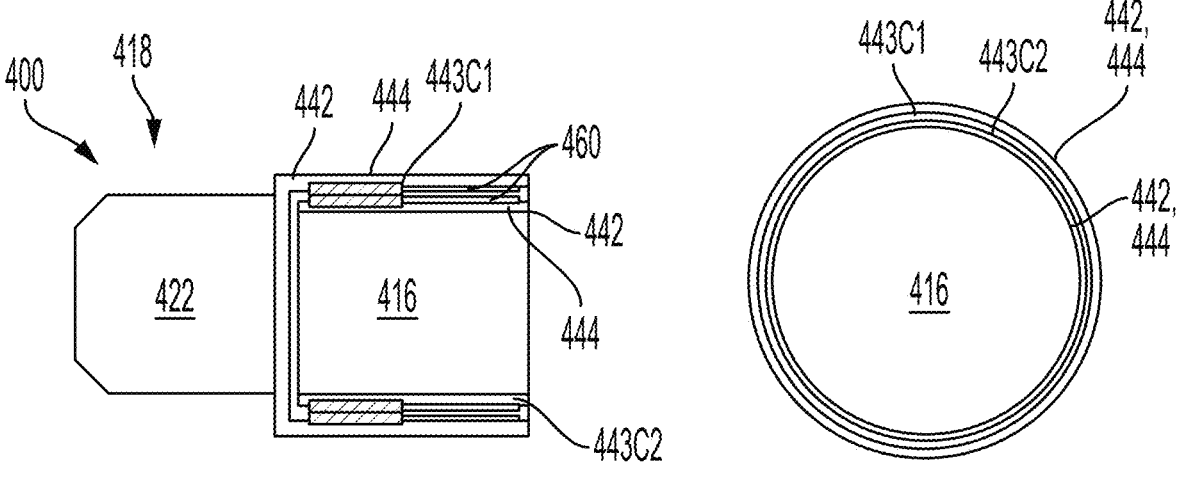
FIGS. 12A-12C show a power tool system having an electrostatic clutch according to another embodiment of the present patent application.
Figure 12C:
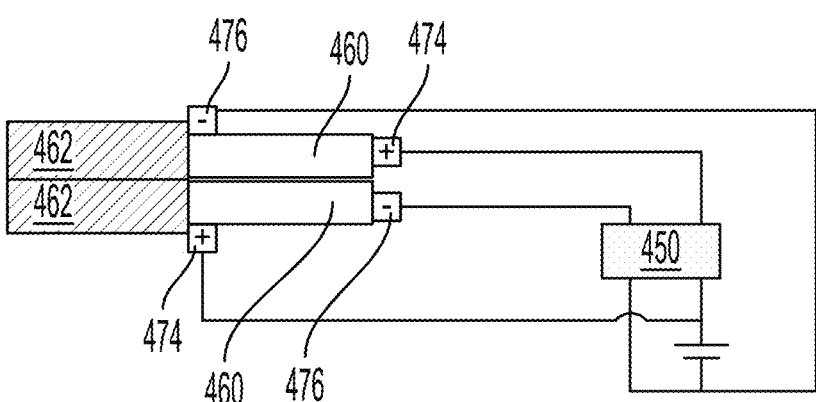

In one embodiment, as shown in FIGS. 12A-12C, the electrodes 442, 444 have coaxial cylindrical configurations to maximize the surface area between the electrodes 442, 444. In one embodiment, first electrode 442 and the second electrode 444 may interchangeably be referred to as input electrode/tube and output electrode/tube, respectively.

In one embodiment, the electrostatic clutch assembly 18 includes a plurality of clutch settings. In one embodiment, each clutch setting corresponds to a desired output operation of the power tool. That is, the clutch setting of the electrostatic clutch 18 can be set by the user based on a desired output operation. For example, the desired output operation can include an amount of material to be removed from a workpiece. In one embodiment, each clutch setting has the set torque. In one embodiment, each clutch setting is associated with a different clutch disengage torque (i.e., a torque at which the electrostatic clutch assembly disengages to thereby prevent the transmission of torque transmission between the motor and transmission assembly 14 and the output shaft 68). In one embodiment, each predetermined clutch setting includes a maximum clutch setting, a minimum clutch setting, and a plurality of intermediate clutch settings between the maximum and minimum clutch settings. In one embodiment, each predetermined clutch setting includes its associated engaged configuration, and its associated disengaged configuration.

The power tool further includes a clutch setting switch or collar that is used to adjust a clutch setting of the electrostatic clutch. In one embodiment, when the user is able to control the amount of slip or rotate, e.g., via the clutch setting switch or collar.

In one embodiment, as shown in FIG. 2, the electrostatic clutch 18 includes positive and negative brushes 74, 76. In one embodiment, the first electrode 42 and the second electrode 44 are coupled to one or more positive and negative brushes, respectively, at the end portions of the electrodes. For example, in one embodiment, the first electrode 42 is coupled to a negative brush 76 at one end thereof and the second electrode 44 is coupled to a positive brush 74 at one end portion thereof. As shown in FIG. 2, the positive brush 74 of one of the electrodes 42, 44 is disposed next to the negative brush 76 of the other of the electrodes 42, 44. In one embodiment, the positive and negative brushes 74, 76 are stationary relative to the tool housing 12. In one embodiment, the positive and negative brushes 74, 76 are configured to provide electrical current to charge the respective electrostatic layer/films 60 and/or the respective electrodes 42, 44. In one embodiment, the electrostatic clutch assembly 18 is configured provide an electrical charge to the first electrode 42 and/or the second electrode 44 when the electrostatic clutch assembly 18 is in either the fully engaged mode or the clutch mode. The positive and negative brushes in the embodiments of FIGS. 7 and 10-11 may have a similar configuration and operation as positive and negative brushes 74, 76 in FIG. 2.

In one embodiment, as shown in and described in detail with respect to FIGS. 2-6 and 13, the electrostatic clutch assembly 18 includes the opposing plates/electrodes 42, 44. When a voltage or a current is applied to the electrodes 42, 44, the electrodes 42, 44 are charged and electrostatically attract, such that above a threshold of the applied voltage the electrodes 42, 44 fully couple so that they will rotate together. Below a threshold of the applied voltage/current, the electrodes 42, 44 fully decouple so that they can rotate relative to one another. And, between those thresholds of the applied voltage/current, the electrodes 42, 44 variably attract, allowing for relative slip or rotation between them based upon the applied torque. In one embodiment, the transitions between the states of the fully engaged, the clutch, and fully disengaged modes have an observable electrical signature/signal by a sensor that may be observed by the tool's control module(s)/controller 50, such that a response to this may be ceasing rotation of the power tool's motor 15. In one embodiment, the torque transfer function is descriptively a function of charge rather than voltage. The electrodes in the embodiments of FIGS. 7 and 10-11 may have a similar configuration and operation as electrodes 42, 44 in FIG. 2.

In one embodiment, the electrostatic clutch assembly 18/218/318 includes a pair of annular disks/electrodes 42, 44 or 242, 244 or 342, 344 as shown in and described in detail with respect to FIGS. 2-5, 7-9B and 10-11. In one embodiment, the electrostatic clutch assembly 418 includes a pair of coaxial cylindrical tubular electrodes 442, 444 for maximizing surface area of the electrostatic clutch 418 for implementation in a tool with a transmission as shown in and described in detail with respect to FIGS. 12A-12C. In one embodiment, the electrostatic clutch assembly 218/418 includes a composition of the electrostatic attractive plates/electrodes 242, 244 or 442, 444 with the electrostatic layers/films 260/460 and the brake pad 262/462 as shown in and described in detail with respect to FIGS. 7-9B and 12A-12C.

Figure 3:
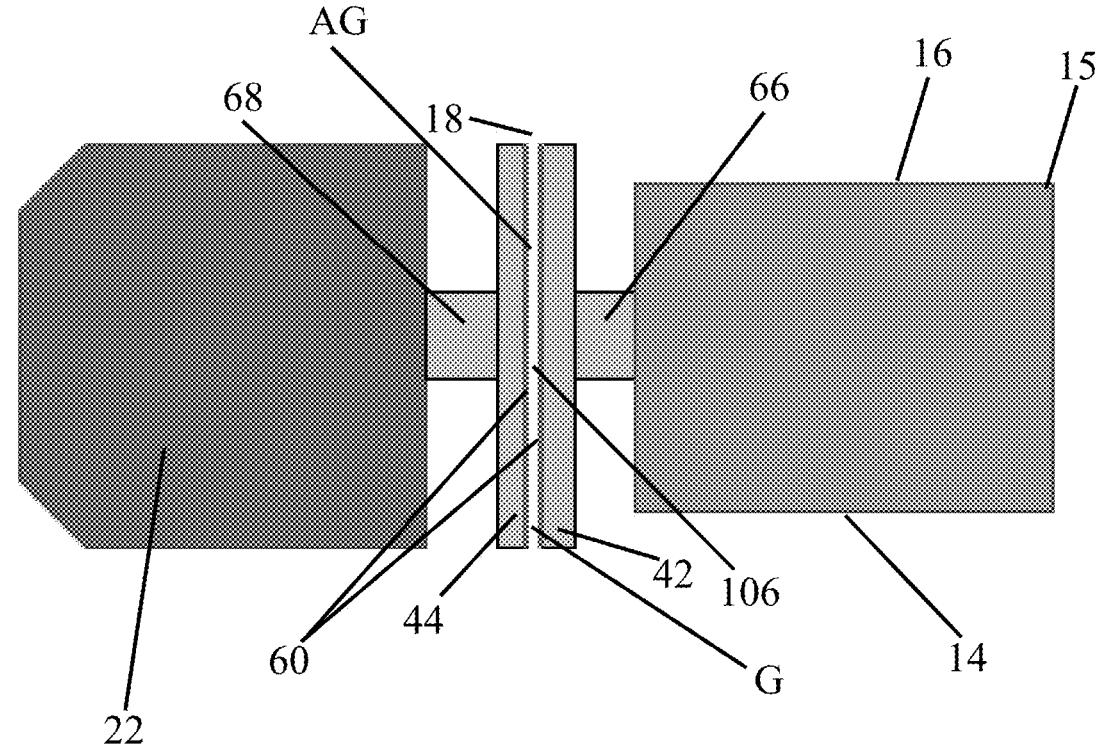
FIG. 3 shows the power tool system of FIG. 2 in a fully disengaged configuration/mode according to an embodiment of the present patent application.

When the electrostatic layers/films 60 are de-energized and/or the electrostatic clutch 18 is in its fully disengaged mode, as shown in FIG. 3, there is a gap G between the electrodes 42, 44 and their respective electrostatic films/layers 60. In one embodiment, the gap G includes an air gap between the dielectric materials/layers of each of the electrostatic films/layers 60. In one embodiment, the gap G includes an air gap between one of the electrostatic films/layers 60 and the dielectric material/layer of the other of the electrostatic films/layers 60. In another embodiment, the gap G includes a dielectric air gap between the electrostatic films/layers 60 and an additional air gap AG.

Figure 4:
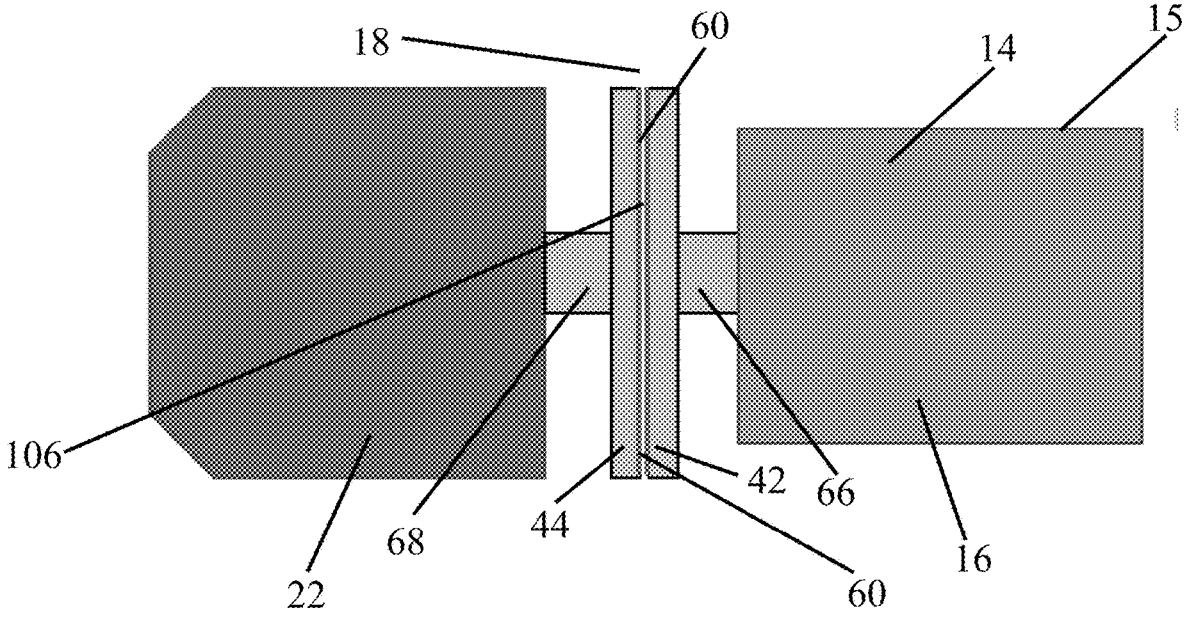
FIG. 4 shows the power tool system of FIG. 2 in a fully engaged mode/configuration according to an embodiment of the present patent application.
Figure 5:
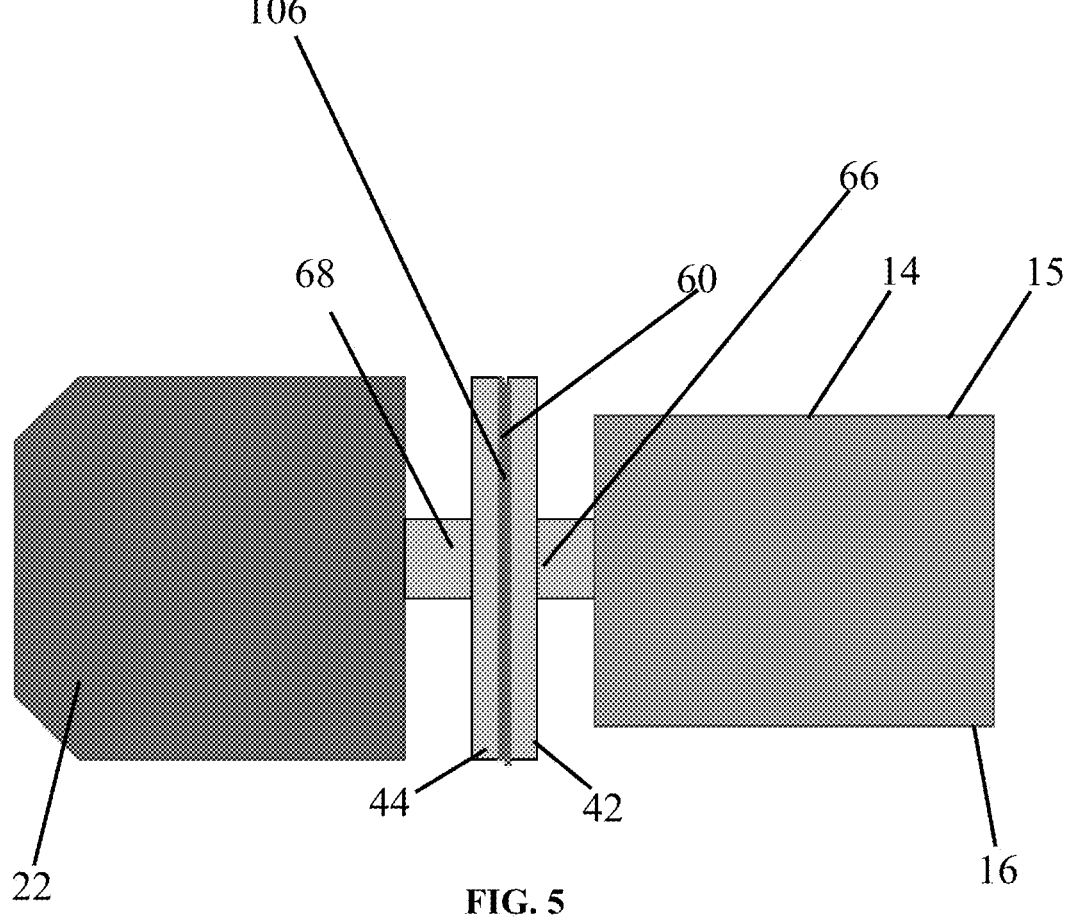
FIG. 5 shows the power tool system of FIG. 2 in a clutch mode/configuration according to an embodiment of the present patent application.

In one embodiment, as shown in FIGS. 4 and 5, when electrical current is applied to the electrostatic films/layers 60 (with opposite polarity as shown in FIG. 2), the electrostatic clutch assembly 18 is in its fully engaged mode/in its clutch mode and the electrostatic films/layers 60 attract one another and the electrodes 42, 44 move axially so that there is no gap or a very tiny gap between them.

In one embodiment, as shown in FIG. 4, when electrical current is applied to the electrostatic films/layers 60 (with opposite polarity as shown in FIG. 2), the electrostatic clutch assembly 18 is in its fully engaged mode and the electrostatic films/layers 60 attract one another and the electrodes 42, 44 move axially so that there is substantially no gap (i.e., only dielectric material layer or a dielectric air gap) between them.

In one embodiment, as shown in FIG. 5, when electrical current is applied to the electrostatic films/layers 60, the electrostatic clutch assembly 18 is in its clutch mode and the electrostatic films/layers 60 attract one another and the electrodes 42, 44 move axially so that there is a very tiny gap (i.e., only dielectric material layer or a dielectric air gap) between them.

In one embodiment, the electrodes 42, 44 are configured to move axially due to small tolerance stack-ups in the transmission 16 and other mechanical components. In one embodiment, the electrodes 42, 44 are also configured to be biased apart (e.g., may include a spring compressing the layers) from one another by a very light spring (not shown) disposed between them.

In one embodiment, the electrostatic clutch assembly 18 is provided in the power tool 10 such that when an electric field is applied to the electrodes 42, 44, the opposing electrodes 42, 44 attract by the mechanism of electrostatic attraction and providing a holding force between the electrodes 42, 44. In one embodiment, the electric field includes a voltage or a current. In one embodiment, the applied voltage is less than 1 kilo Volts (kV).

In one embodiment, the controller 50 is operatively cooperable with the motor and transmission assembly 14 and the electrostatic clutch assembly 18 to operate in the fully engaged mode wherein an electric field above a first predetermined threshold is applied across the first electrode 42 and the second electrode 44 causing a first electrostatic force between the first electrode 42 and the second electrode 44 to rotationally couple the output shaft 68 with the motor 15 such that the output shaft 68, the input shaft 66, and the motor and transmission assembly 14 move together at the same velocity. In this configuration, as shown in FIG. 4, the respective shafts 66, 68 (i.e., connected to the opposing electrodes 42, 44) operate at the same speed. For example, both the shaft 66 connected to the electrode 42 and the shaft 68 connected to the electrode 44 rotate at 2 k RPM. This speed disclosed is exemplary and not intended to be limiting in anyway. This configuration may be referred to as the fully engaged mode, the drill and hammer drill mode/configuration, or the full holding force configuration of the electrostatic clutch 18.

In one embodiment, when the electrostatic clutch assembly 18 is in the fully engaged mode, the first electrode 42 and the second electrode 44 of the electrostatic clutch assembly 18 are attracted to each other. In one embodiment, as shown in FIG. 4, when the electrostatic clutch assembly 18 is in the fully engaged mode, the first electrode 42 and the second electrode 44 of the electrostatic clutch assembly 18 are positioned in such a way that no gap (i.e., only dielectric material layer or a dielectric air gap) exists between surfaces of the first electrode 42 and the second electrode 44 that face each other.

In one embodiment, the controller 50 is operatively cooperable with the motor and transmission assembly 14 and the electrostatic clutch assembly 18 to operate in the fully disengaged mode wherein an electric field below a second predetermined threshold between the first electrode 42 and the second electrode 44 causes the output shaft 68 to be rotationally decoupled from the motor and transmission assembly 14 and input shaft 66. As shown in FIG. 3, when the electric field is removed from or is not applied to the electrodes 42, 44, the electrodes 42, 44 do not have electrostatic attraction therebetween and the electrodes 42, 44 are decoupled allowing independent rotation of their respective shafts 66, 68. This configuration may be referred to as the fully disengaged mode/configuration or a full decoupling configuration of the electrostatic clutch 18.

In one embodiment, when the electrostatic clutch assembly 18 is in the fully disengaged mode, there is no electrostatic charge present between the first electrode 42 and the second electrode 44 of the electrostatic clutch assembly 18. In one embodiment, when the electrostatic clutch assembly 18 is in the disengaged mode, the first electrode 42 and the second electrode 44 of the electrostatic clutch assembly 18 are not attracted to each other. In one embodiment, when the electrostatic clutch assembly 18 is in the fully disengaged mode, the first electrode 42 and the second electrode 44 of the electrostatic clutch assembly 18 are positioned in such a way that a gap G (as shown in FIG. 3) exists between surfaces of the first electrode 42 and the second electrode 44 that face each other. In one embodiment, as discussed in detail above, the gap G includes a dielectric (air or material) gap 106 between the electrostatic films/layers 60 and the additional air gap AG.

In one embodiment, the controller 50 is operatively cooperable with the motor and transmission assembly 14 and the electrostatic clutch assembly 18 to operate in the clutch mode wherein an electric field between the first predetermined threshold and the second predetermined threshold is applied across the first electrode 42 and the second electrode 44 causing a second electrostatic force between the first electrode 42 and the second electrode 44 to rotationally couple the output shaft 68 with the input shaft 66 and the motor and transmission assembly 14 such that the output shaft 68 moves together at the same velocity as the input shaft 66 and the motor and transmission assembly 14 when the torque therebetween is below a set torque, and permits the output shaft 68 to rotate at a lower or zero speed relative to the input shaft 66 and motor 15 when the torque therebetween is above the set torque. In between the full engaged configuration of FIG. 4 and the full disengaged mode of FIG. 3, a variable electric field is applied to the electrodes 42, 44 that produces a holding torque where the application/applied torque below a predetermined/set value the electrodes 42, 44 are coupled, but where the application/applied torque exceeds the predetermined/set value, the electrodes 42, 44 slip or rotate relative to one another, thereby limiting the torque application at the working bit. This configuration may be referred to as the clutch mode. In this configuration, as shown in FIG. 5, the respective shafts 66, 68 (i.e., connected to the opposing electrodes 42, 44) operate at the different speeds. For example, the shaft 66 connected to the electrode 42 rotates at 2 k RPM, while the shaft 68 connected to the electrode 44 rotates at 0-10 RPM. These speeds disclosed are exemplary and not intended to be limiting in any way.

In one embodiment, when the electrostatic clutch assembly 18 is in the clutch mode and when the torque between the output shaft 68 and the motor and transmission assembly 14 is above the set torque, the velocity of the output shaft 66 is zero. In one embodiment, when the electrostatic clutch assembly 18 is in the clutch mode, the first electrode 42 and the second electrode 44 of the electrostatic clutch assembly 18 are variably attracted to each other. In one embodiment, as shown in FIG. 5, when the electrostatic clutch assembly 18 is in the clutch mode, the first electrode 42 and the second electrode 44 of the electrostatic clutch assembly 18 are positioned in such a way that no gap (i.e., only dielectric material layer or a dielectric air gap) exists between surfaces of the first electrode 42 and the second electrode 44 that face each other.

In one embodiment, the clutch mode includes a first mode of operation and a second mode of operation.

In the first mode of operation, the control circuit 50 causes a first voltage to be applied across the first electrode 42 and a second voltage with a polarity opposite a polarity the first voltage to be applied to the second electrode 44, generating a first attractive force between the first and second electrodes 42, 44, which causes the output member 68 to rotate together with the input member 66 when a torque on the output member 68 is less than or equal to a first threshold value (e.g., when the torque on the output member is such that a shear force or torque about the rotational axis of the output shaft is less than or equal to the attractive force between the electrodes) and which causes the output member 68 to rotationally slip relative to the input member 66 when the torque on the output member 68 exceeds the first threshold value (e.g., when the torque on the output member is such that a shear force or torque about the rotational axis of the output shaft is greater than the attractive force between the electrodes), interrupting torque transmission from the input member 66 to the output member 68. In one embodiment, the first threshold corresponds to the first attractive force.

In one embodiment, in the second mode of operation, the control circuit 50 causes a third voltage to be applied across the first electrode 42 and a fourth voltage with a polarity opposite a polarity the third voltage to be applied to the second electrode 44, generating a second attractive force between the first and second electrodes 42, 44, which causes the output member 68 to rotate together with the input member 66 when a torque on the output member 68 is less than or equal to a second threshold value and which causes the output member 68 to (e.g., rotationally) slip or rotate relative to the input member 66 when the torque on the output member 68 exceeds the second threshold value, interrupting torque transmission from the input member 66 to the output member 68. That is, in one embodiment, in the second mode of operation, the control circuit 50 causes the third voltage to be applied to the first electrode 42 and a different fourth voltage to be applied to the second electrode 44.

In one embodiment, the third voltage is greater than the first voltage, the fourth voltage is greater than the second voltage, the second attractive force is greater than the first attractive force, and the second threshold value is greater than the first threshold value. In one embodiment, a second voltage difference between the third voltage and the fourth voltage is greater than a first voltage difference between the first voltage and the second voltage.

In one embodiment, as shown in FIG. 13, the power tool 10 further comprising a selector switch 104 coupled to the housing 12 that is actuatable by a user to select between the first and second modes of operation.

In one embodiment, in a third mode of operation, the control circuit 50 causes a zero voltage difference to be applied to the first and second electrodes 42, 44, allowing the second electrode to rotate relative to the first electrode and preventing torque transmission from the input member 66 to the output member 68. In one embodiment, the control circuit 50 is configured to automatically switch from the first mode to the third mode upon sensing (e.g., by a sensor) that the output member 68 has rotationally slipped or rotated relative to the input member 66.

In one embodiment, in a fourth mode of operation, the electrostatic clutch assembly 18 is configured to prevent interruption of torque transmission from the input member 66 to the output member 68.

In one embodiment, in the fourth mode of operation, the control circuit may cause a fifth voltage to be applied across the first electrode 42 and a different sixth voltage to be applied to the second electrode 44, generating a third attractive force between the first and second electrodes 42, 44, the third attractive force exceeding a torque on the output member 68 during operation of the power tool 10. The second voltage may have a polarity opposite a polarity of the first voltage. In one embodiment, the first voltage difference is user selectable to adjust the first attractive force and the first threshold value. In one embodiment, a greater voltage difference corresponds to a greater first attractive force and a greater first threshold value.

In one embodiment, the electrostatic clutch assembly 18 is held in the clutch mode such that when the working element meets a dynamic impact event, the electrostatic clutch 18 slips or rotates. Thus, this configuration provides protection to the elements of the power tool, e.g., a mower blade striking a rock.

When energized, the electrodes/discs 42, 44 rotate together as a unit until the output torque on the chuck/tool holder 22 exceeds the holding force of the electrostatic films/layers 60. At this time, the electrodes/discs 42, 44 rotate relative to one another with only a small frictional force between them. The input shaft 66 and the input disc 42 will continue to rotate, while the output disc 44 coasts to rest.

Figure 6:
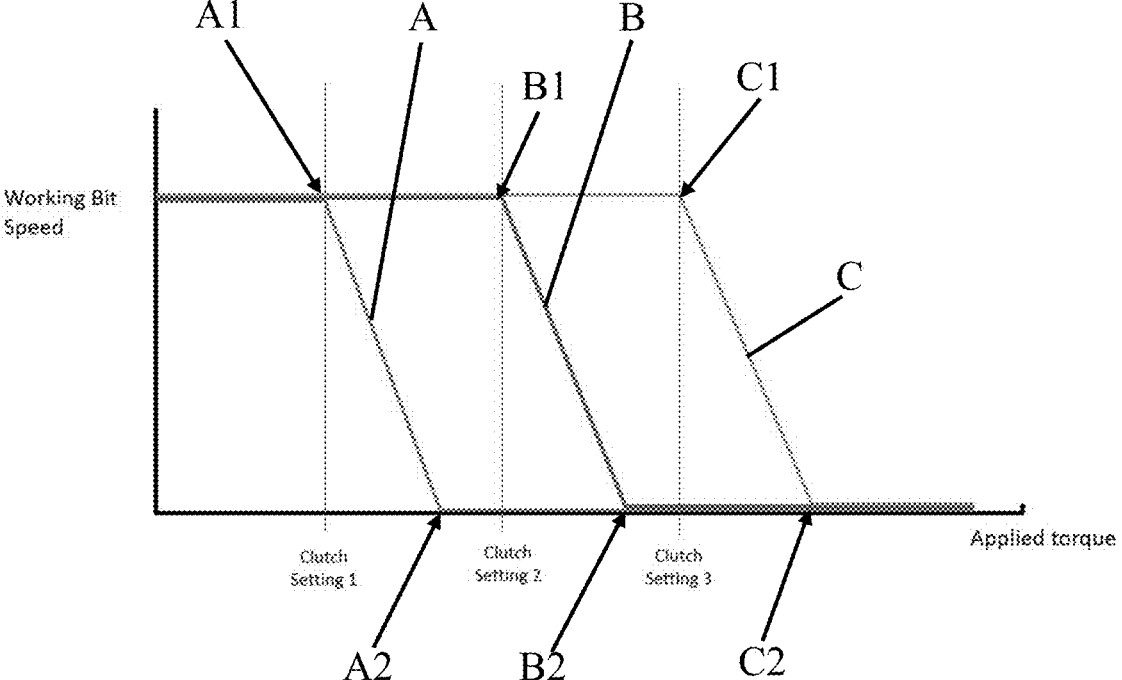
FIG. 6 shows a graphical representation of the relationship between the working bit speed and the applied torque of the power tool under different clutch settings in the clutch mode according to an embodiment of the present patent application.

In one embodiment, depending on the amount of voltage or current applied to the electrostatic films/layers 60, the charge and their holding force can vary. Thus, there can be different clutch settings for different amounts of voltage or current applied to the electrostatic films/layers 60. This is indicated by clutch settings 1, 2, and 3 and lines A, B and C in FIG. 6. FIG. 6 shows a graphical representation of the various working bit speeds at different clutch settings of the system/power tool 10 of the present patent application. The working bit speeds (i.e., measured in revolutions/minute (RPM)) at different clutch settings in the clutch mode are shown on the left-hand side Y-axis of the graph in FIG. 6 and the applied torque (i.e., measured in Nm) are on the X-axis of the graph FIG. 6. As shown in FIG. 6, at each different clutch setting, the working bit speed drops fast/instantaneously/drastically (from speed A1 to speed A2 at a first torque corresponding to clutch setting 1, from speed B1 to speed B2 at a torque corresponding to clutch setting 2, and from speed C1 to speed C2 at a torque corresponding to clutch setting 3), where the applied voltage corresponding to the torque at which the electrostatic clutch 18 begins to slip or rotate is different for different clutch settings (e.g., greater applied voltage corresponds to greater torque or clutch setting).

In one embodiment, the power tool/system 10 includes a sensor that senses when the electrostatic clutch 18 slips or rotates (e.g., a current sensor or a rotational motion/position sensor that are described above)) and that causes the control circuit/controller 50 to de-energize the electrostatic films/layers 60 after the electrostatic clutch 18 slips or rotates. In one embodiment, the power tool/system 10 includes a sensor configured to sense whether the electrostatic clutch assembly 18 is in the fully engaged mode, the fully disengaged mode, or the clutch mode and output a signal to the controller 50. In one embodiment, the controller 50, in response to the received signal from the sensor, is configured to stop the rotation of the motor and transmission assembly 14. The sensor may comprise one or more of a current sensor, a position sensor, and a rotational motion sensor.

In one embodiment, the power tool 10 further comprises a selector switch 104 (as shown in FIG. 13) actuatable by a user to select between the first and second modes of operation. In one embodiment, in a third mode of operation, the control circuit 50 causes zero voltage to be applied to the first and second electrodes, preventing motion from being transmitted from the input member 66 to the output member 68. In one embodiment, the control circuit 50 is configured to automatically switch from the first mode to the third mode upon sensing that the motion transmission from the input member 66 to the output member 68 has been interrupted.

In one embodiment, the power tool system 10 includes a sensor that senses when the electrostatic clutch 18 slips or rotates (e.g., a current sensor or a rotational motion sensor as described above) and that causes the control circuit/controller 50 to de-energize the electrostatic films/layers 60 after the electrostatic clutch assembly 18 slips or rotates.

In another embodiment, as shown in FIGS. 7-9B, the present patent application provides the electrostatic clutch assembly 218 that may include the input member 266, the output member 268, at least one frictional surface 262, the first electrode 242, the second electrode 244, the dielectric layer 206, and a control circuit 250. The input member 266 is configured to be selectively driven in motion. The output member 268 is configured to selectively output a motion. The first electrode 242 is electrically couplable to the electrical power source 202. The second electrode 244 is electrically couplable to the electrical power source 202. The dielectric layer 206 is separating the first electrode 242 and the second electrode 244. The control circuit 250 is operatively cooperable with the motor and transmission assembly 214 and the first and second electrodes 242, 244 to control electrical power delivery from the electrical power source 202 to the motor and transmission assembly 214 and to the first and second electrodes 242, 244. In a first mode of operation, the control circuit 250 causes a voltage difference to be applied across the first and second electrodes 242, 244, generating a first attractive force between the first and second electrodes 242, 244. For example, a first voltage may be applied across the first electrode 242 and a second voltage with a polarity opposite a polarity the first voltage may be applied to the second electrode 244, generating a first attractive force between the first and second electrodes 242, 244, which causes the frictional surface 262 to frictionally engage with at least one of the input member 266 and the output member 268 to enable motion to be transmitted from the input member 266 to the output member 268. In one embodiment, the at least one frictional surface 262 of the electrostatic clutch assembly 218 is a brake pad that engages one or both of the input and output members 266, 268 when the electrodes 242, 244 are energized.

FIGS. 7-9B show another embodiment of the present patent application that differs from the embodiment in FIGS. 2-5 in that the input rotating disc 242 and the output rotating disc 244 are/have brake pads or have other frictional materials/surfaces that face one another. Other than this difference, the power tool system 200 with the electronic clutch 218 in FIGS. 7-9B has many of the same elements and the same operation as the power tool system 10 with the electronic clutch 18 shown in FIGS. 2-5 so that those similar elements and the operation of this embodiment of the power tool system 200 will not be described in detail.

Figure 8A:
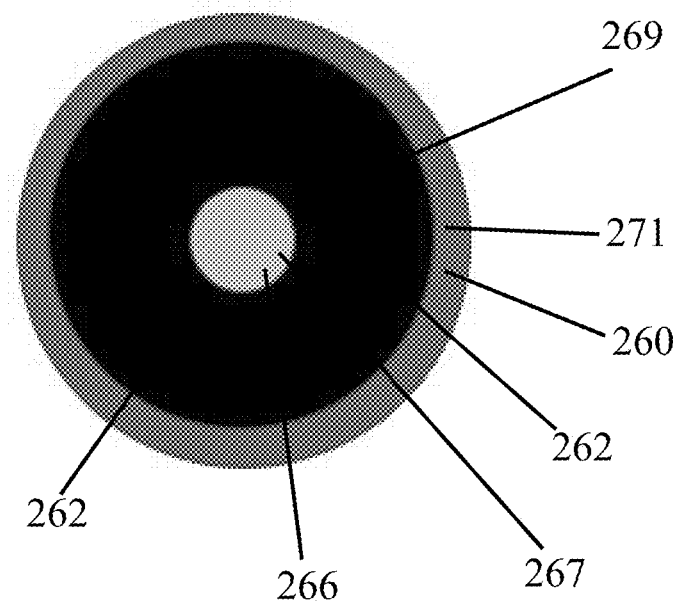
FIGS. 8A and 8B show electrode members of the power tool system of FIG. 7 and their frictional elements/brake pads according to one embodiment of the present patent application.
Figure 8B:
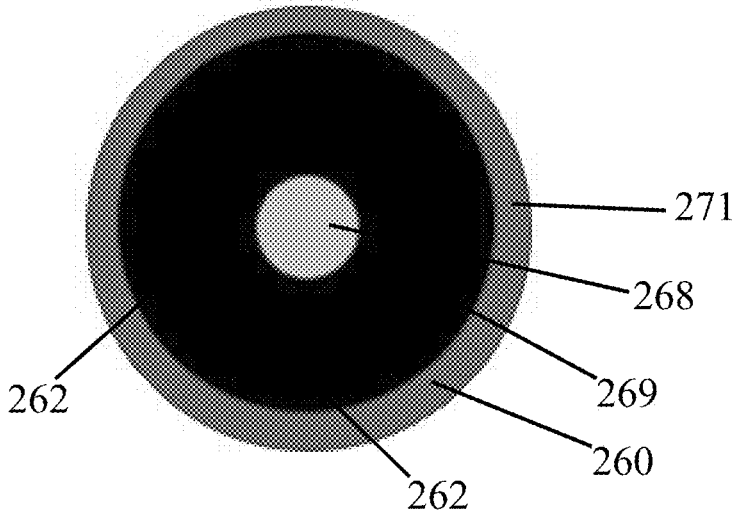

In one embodiment, as shown in FIGS. 8A and 8B, each of the first electrode 242 and the second electrode 244 includes a brake pad 262 disposed on at least a portion thereof. In one embodiment, each electrode 242, 244 has a central opening 267 therein to receive and connect with their respective shafts 266, 268. In one embodiment, each electrode 242, 244 has a brake pad portion 269 surrounding the central opening 267. In one embodiment, the brake pad portion 269 has the brake pad (material) 262. In one embodiment, each electrode 242, 244 has an electrostatic portion 271 surrounding the brake pad portion 269. In one embodiment, the electrostatic portion 271 has the electrostatic (material) film/layer 260. As shown in FIGS. 8A and 8B, the brake pads 262 are surrounded by annular discs that carry facing electrostatic films/layers 260 that rotate together with the brake pads 262.

In one embodiment, the frictional materials/surfaces comprise brake pads 262. In various embodiments, different materials can be used to create friction between the input rotating disc 242 and the output rotating disc 244 when they contact one another. Such materials can include ceramics, metal materials (e.g., steel), rubber materials, Kevlar, and/or carbon compounds on one or both of the contacting surfaces.

Figure 9A:
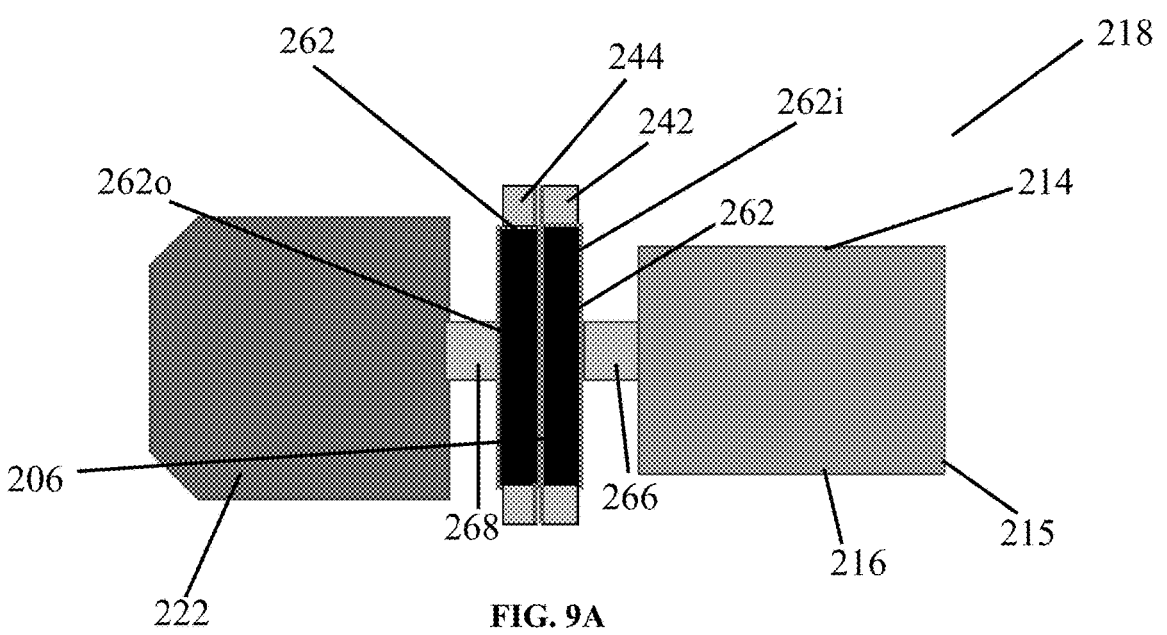
FIGS. 9A and 9B show the power tool system of FIG. 7 in the fully engaged mode, in the clutch mode and in the fully disengaged mode according to an embodiment of the present patent application.
Figure 9B:
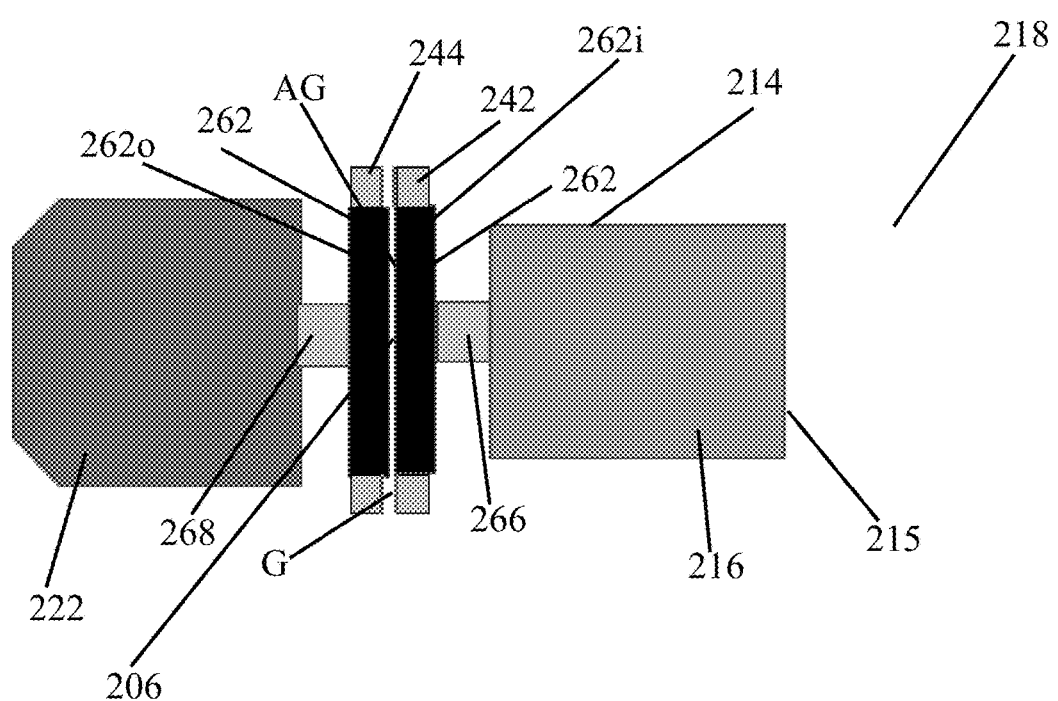

When the electrostatic clutch 218 is in its fully disengaged mode and the electrostatic films/layers 260 are de-energized, there is a gap G (as shown in FIG. 9B) between both the brake pads 262i, 262o and the electrostatic films/layers 260 so that no torque is transmitted. In one embodiment, the gap between the electrostatic films/layers 260 includes an air gap between the dielectric materials/layers of each of the electrostatic films/layers 260. In one embodiment, the gap between the electrostatic films/layers 260 includes an air gap between one of the electrostatic films/layers 260 and the dielectric material/layer of the other of the electrostatic films/layers 260. In another embodiment, the gap between the electrostatic films/layers 260 includes a dielectric air gap between the electrostatic films/layers 260 and the additional air gap AG.

In one embodiment, as shown in FIG. 9B, when the electrostatic clutch assembly 218 is in the fully disengaged mode, the electrostatic layers 260 of the electrodes 242, 244 are separated from each other. In this fully disengaged mode, the electrostatic layers 260 of the electrodes 242, 244 are separated by the dielectric material layer or the dielectric air gap 206 and the additional air gap AG. Also, when the electrostatic clutch assembly 218 is in the fully disengaged mode, the brake pads 262 on the electrodes 242 and 244 are also separated from each other. That is, in one embodiment, when the electrostatic clutch assembly 218 is in the fully disengaged mode, the frictional force(s) between the frictional surfaces of the electrodes 242, 244 are relieved by some/slight axial relative movement (e.g., movement in the axial direction) of the components of the electrostatic clutch assembly 218 and/or other the components of the power tool that are positioned between the motor and transmission assembly 214 2 and the chuck 222. In one embodiment, such axial movement of the components may be achieved using a spring force. For example, the frictional forces between the electrodes 242 and 44 can be relieved, in the fully disengaged mode, by biasing the electrodes 242 and 244 apart from one another by a light spring force (not shown) that operates to bias one or both of the electrodes 242/244 away from the other. The spring force can be created using a mechanical spring (e.g., coil spring, tension spring, leaf spring, etc.). In another embodiment, such axial movement of the components may be achieved using other energy or force types, such as electrical, electromechanical, and/or electromagnetic. In another embodiment, such axial movement of the components may be achieved without application of any force, but rather simply be a passive movement resulting only from a release of electrostatic forces between the electrodes, permitted the friction surfaces to separate.

Figure 7:
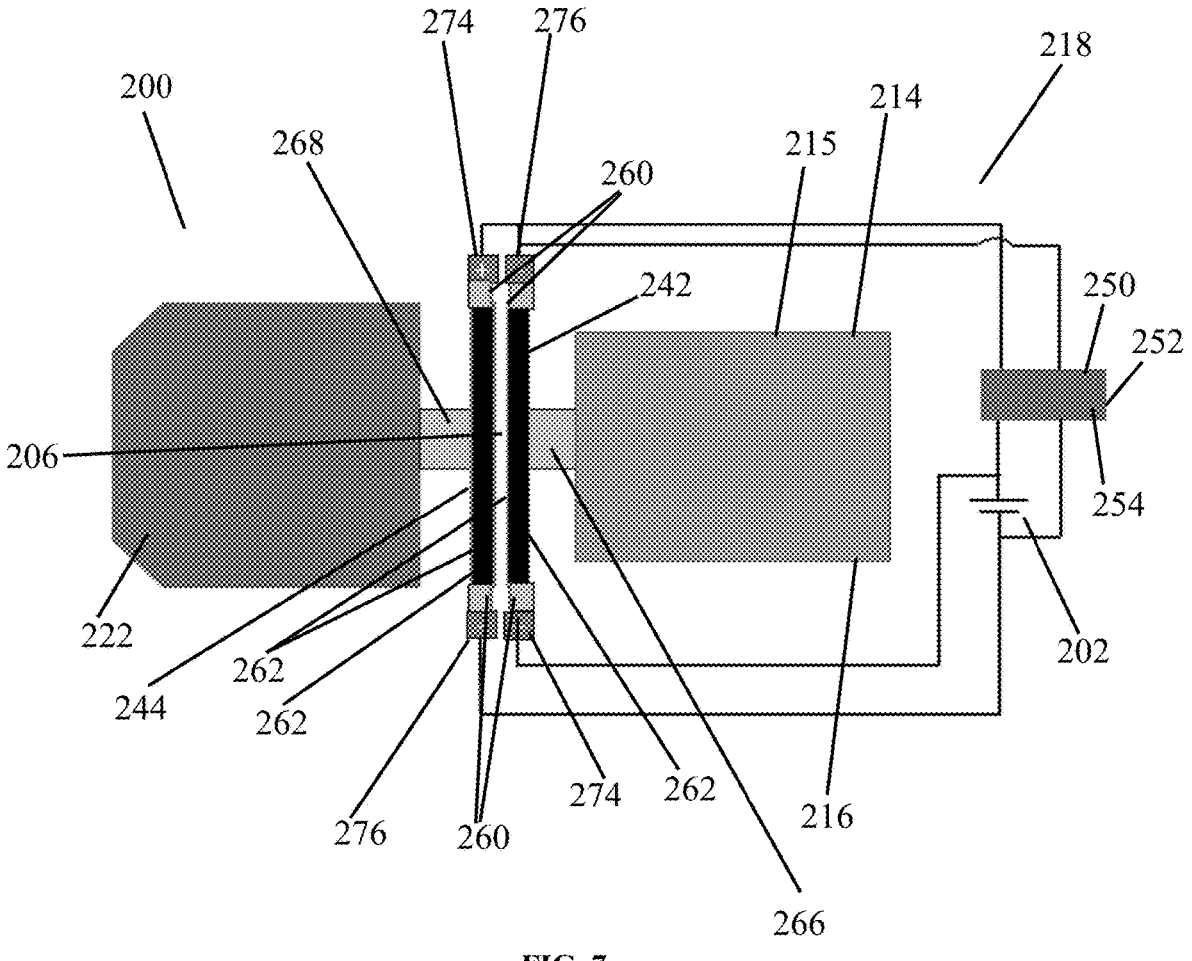
FIG. 7 shows a power tool system having an electrostatic clutch according to various embodiments of the present patent application.

When the electrostatic films/layers 260 are energized with opposite polarity by the stationary brushes 274, 276 (as shown in FIG. 7) and when the electrostatic clutch assembly 218 is in either its fully engaged mode or its clutch mode, the input disc 242 and the output disc 244 are drawn/attracted toward one another.

As shown in FIG. 9A, the brake pads 262i, 262o engage each other so that there is no gap between the brake pads 262i, 262o when the electrostatic clutch assembly 218 is in its fully engaged mode. In one embodiment, the electrostatic films/layers 260 touch or there may be a tiny gap (i.e., dielectric material or dielectric air gap) between the electrostatic films/layers 260 when the electrostatic clutch assembly 218 is in its fully engaged mode.

In one embodiment, as shown in FIG. 9A, when the electrostatic clutch assembly 218 is in the fully engaged mode, the electrostatic layers 260 of the electrodes 242, 44 are held in contact with each other due to a holding/an attractive/an electrostatic force therebetween generated due to the electric field applied to the electrodes 242, 244. In one embodiment, in this fully engaged mode, the electrostatic layers 260 of the electrodes 242, 244 are separated by the dielectric material layer or the dielectric air gap 206. Also, when the electrostatic clutch assembly 218 is in the fully engaged mode, the brake pads 262 on the electrodes 242, 244 are held in contact with each other due to a friction force therebetween. That is, in one embodiment, when the electrostatic clutch assembly 218 in the fully engaged mode, the electrodes 242, 244 (e.g., the brake pads 262 thereof) are disposed in contact with each other, with a combination of the holding/attractive/electrostatic force and the frictional force therebetween. In one embodiment, the amount of the holding/attractive/electrostatic force between the electrodes 242/244 is configured to be adjusted by adjusting the electric field (e.g., voltage or current) applied thereto. In one embodiment, the amount of the frictional force between the electrodes 242/244 may optionally also be adjusted. For example, the electrostatic clutch assembly 218 may include a tension adjustment mechanism that is operated to adjust the amount of the frictional force between the electrodes 242/244. That is, in one embodiment, when the electrostatic clutch assembly 218 is in the fully engaged mode, the electrodes 242, 244 are held in contact with each other by adjusting the frictional force therebetween, the attractive/electrostatic force therebetween, or any combination of the frictional force and the attractive/electrostatic force therebetween.

In one embodiment, the tension adjustment mechanism of the electrostatic clutch assembly 218 is operated to adjust the amount of the frictional force between the electrodes 242/244 so as to relieve the frictional forces between the electrodes 242/244 when the electrostatic clutch assembly 218 is in the fully disengaged mode.

Similarly, in one embodiment, the electrostatic films/layers 260 touch or there may be a tiny gap (i.e., dielectric material or dielectric air gap) between the electrostatic films/layers 260 and there is no gap between brake pads 262i, 262o when the electrostatic clutch 218 is in its clutch mode. Also, in the clutch mode of the electrostatic clutch assembly 218, the output brake pad 262o slips or rotates relative to the input brake pad 262i when the output torque overcomes the frictional force between the brake pads 262i, 262o and the holding force of the energized electrostatic films/layers 260.

In one embodiment, the clutch mode of the power tool includes a first mode of operation and a second mode of operation.

In one embodiment, in the first mode of operation, the control circuit 250 causes a first voltage to be applied across the first electrode 242 and a second voltage with a polarity opposite a polarity the first voltage to be applied to the second electrode 244, generating a first attractive force between the first and second electrodes 242, 244, which causes the frictional surface 262 to frictionally engage with at least one of the input member 266 and the output member 268 to enable motion to be transmitted from the input member 266 to the output member 268. In one embodiment, this embodiment, is generally directed to an electrostatic clutch assembly 218, regardless of whether it is in a power tool. In one embodiment, the at least one frictional surface 262 of the electrostatic clutch assembly 218 is a brake pad that engages one or both of the input and output members 266, 268 when the electrodes 242, 244 are energized.

In one embodiment, in the first mode of operation, motion from the input member 266 to the output member 268 is interrupted when a force applied to the output member 268 is greater than a first threshold value. In one embodiment, the first threshold value corresponds to a frictional force between the frictional surface 262 and at least one of the input member 266 and the output member 268.

In one embodiment, in the second mode of operation, the control circuit 250 causes a third voltage to be applied across the first electrode 242 and a fourth voltage with a polarity opposite a polarity the third voltage to be applied to the second electrode 244, generating a second attractive force between the first and second electrodes 242, 244, which causes the frictional surface to frictionally engage with at least one of the input member 266 and the output member 268 to enable motion to be transmitted from the input member 266 to the output member 268 when a force applied to the output member 268 is less than or equal to a second threshold value and the to interrupt force transmission from the input member 266 to the output member 268 when the force applied to the output member 268 is greater than the second threshold value.

In one embodiment, the third voltage is greater than the first voltage, the fourth voltage is greater than the second voltage, the second attractive force is greater than the first attractive force, and the second threshold value is greater than the first threshold value.

The embodiment of FIGS. 7-9B is different from the embodiment of FIGS. 2-5 insofar as the primary wear surfaces are the brake pads 262 (262i, 262o) in the embodiment of FIGS. 7-9B, and the primary wear surfaces are the electrostatic films/layers 60 in the embodiment of FIGS. 2-5.

Figure 10:
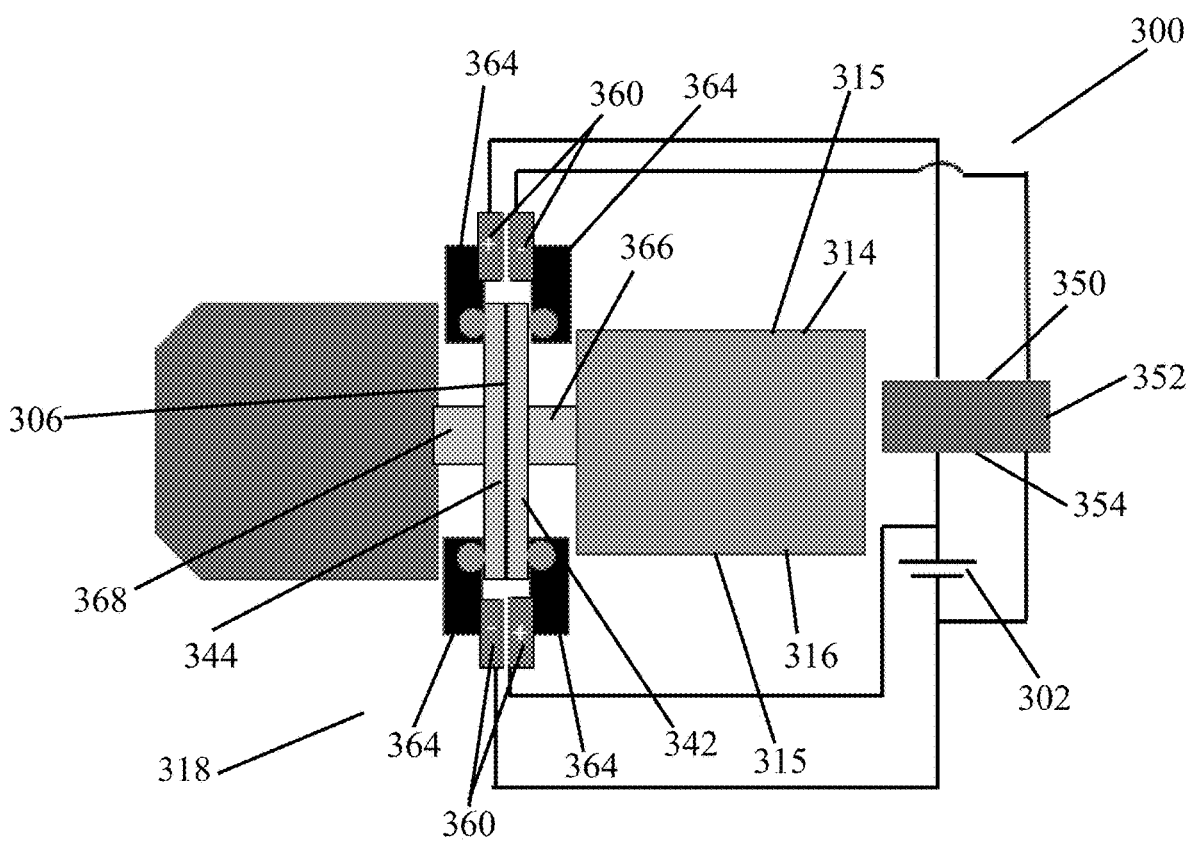
FIG. 10 shows a power tool system having an electrostatic clutch according to various embodiments embodiment of the present patent application, wherein the power tool system is in a fully engaged mode or in a clutch mode.
Figure 11:
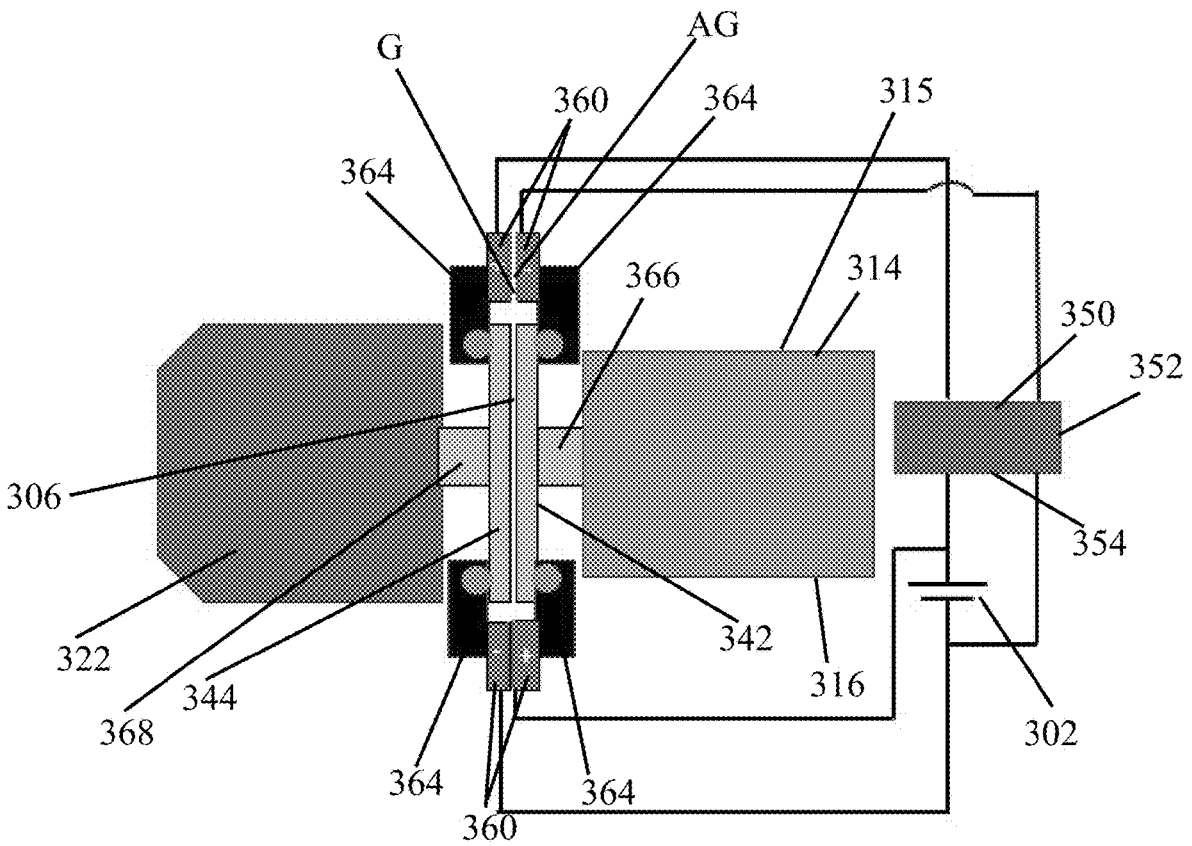
FIG. 11 shows the power tool system of FIG. 10 in a fully disengaged mode according to an embodiment of the present patent application.

FIGS. 10-11 show another embodiment of the present patent application that differs from the embodiment in FIGS. 2-5 in that the input rotating disc 342 and the output rotating disc 344 are/have brake pads or have other frictional materials/surfaces that face one another and the power tool system 300 also includes thrust bearings 364 as described in detail below. Other than these differences, the power tool system 300 with the electronic clutch assembly 318 in FIGS. 10-11 has many of the same elements and the same operation as the power tool system 10 with the electronic clutch assembly 18 shown in FIGS. 2-5 so that those similar elements and the operation of this embodiment of the power tool system 300 will not be described in detail.

As shown in FIGS. 10-11, the power tool system 300 includes the input disc 342 rotating with the input shaft 366 and the output disc 344 rotating the output shaft 368 and the input rotating disc 342 and the output rotating disc 344 may have frictional surfaces or brake pads that face one another. In one embodiment, the rear sides/surfaces of the discs 342, 344 are engaged by the thrust bearings 364 (e.g., ball thrust bearings) that are rotationally stationary but axially moveable relative to the housing 312. In one embodiment, the thrust bearings 364 are coupled to the electrostatic films/ layers 360 that are stationary relative to the housing 312.

In one embodiment, referring to FIGS. 10-11, each of the first electrode 342 and the second electrode 344 includes an annular member 342/344, a thrust bearing 364, and an electrostatic film member 360. In one embodiment, referring to FIGS. 10-11, the dielectric layer 306 separates the electrostatic film members 360. In one embodiment, the thrust bearing 364 of each of the first electrode 342 and the second electrode 344 is operatively connected to the associated annular member 342/344 and the associated electrostatic film member 360. In one embodiment, the annular members 342, 344 of the first electrode 342 and the second electrode 344 are operatively connected to the motor and transmission assembly and the output shaft 368, respectively. In one embodiment, each of the first electrode 342 and the second electrode 344 includes a brake pad 362 disposed on at least a portion of the annular member 342, 344. In one embodiment, each annular member 342, 344 has a central opening 367 therein to receive and connect with their respective shafts 366, 368.

When the electrostatic clutch 318 is in either its fully engaged mode or its clutch mode, and the electrostatic films/layers 360 are energized, the thrust bearings 364 push thrust plates toward one another, bringing the input and output discs 342, 344 into frictional contact with each other. There may be no gap or a tiny gap (e.g., a dielectric material/dielectric air gap) between the electrostatic films/ layers 360. There is also no gap between the input disc 342 and the output disc 344. At the same time, the discs 342, 344 are permitted to rotate relative to the thrust bearings 64. In the clutch mode of the electrostatic clutch 318, the output disc 344 will slip or rotate relative to the input disc 342 when the output torque overcomes the frictional force between the discs 342, 344 and the holding force of the energized electrostatic films/layers 360.

When the electrostatic clutch 318 is in its fully disengaged mode and the electrostatic films/layers 360 are de-energized, the electrostatic films/layers 360 separate and the thrust bearings 364 no longer push the thrust bearings 364 toward one another, allowing the frictional surfaces to separate (which may be further facilitated by a light spring or elastic member acting on one or both of the input member and output member to bias them apart from one another). There is a gap (e.g., a dielectric material/dielectric air gap and the additional air gap AG) between the electrostatic films/layers 360 and also there is a gap between the input disc 342 and the output disc 344.

In one embodiment, the power tool system 300 has a sensor that senses when the electrostatic clutch 318 slips or rotates (e.g., a current sensor or a rotational motion sensor) and that causes the control circuit/controller to de-energize the electrostatic films/layers 360 after the electrostatic clutch 318 slips or rotates.

This embodiment of FIGS. 10-11 is different from the first embodiment of FIGS. 2-5 insofar as the primary wear surfaces in the embodiment of FIGS. 10-11 are brake pads 362, and the primary wear surfaces are the electrostatic films/layers 60 in the embodiment of FIGS. 2-5.

FIGS. 12A-12C show another embodiment of the present patent application that differs from the embodiment in FIGS. 2-5 in that brake pads 462 and electrostatic films/layers 460 are arranged on facing surfaces of concentric input and output cylinders 442, 444. Other than these differences, the power tool system 400 with the electronic clutch assembly 418 in FIGS. 12A-12C has many of the same elements and the same operation as the power tool system 10 with the electronic clutch assembly 18 shown in FIGS. 2-5 so that those similar elements and the operation of this embodiment of the power tool system 400 will not be described in detail.

In one embodiment, the electrostatic clutch assembly 418 includes electrostatic films 460 that are arranged on facing surfaces of the concentric input and output cylinders 442, 444. In one embodiment, the electrostatic clutch assembly 418 includes the dielectric layer (e.g., dielectric material or dielectric air gap) 406 that separates electrostatic films 460.

In another embodiment, the electrostatic clutch assembly 418 includes a combination of the electrostatic films 460 and the brake pads 462 that are arranged on facing surfaces of the concentric input and output cylinders 442, 444. In one embodiment, the electrostatic clutch assembly 418 includes the dielectric layer (e.g., dielectric material or dielectric air gap) 406 that separates electrostatic films 460.

In one embodiment, as shown in FIGS. 12A-12C, one of the first electrode 442 and the second electrode 444 includes a cylindrical member 443c1 and the other of the first electrode 442 and the second electrode 444 includes a different diameter coaxial cylindrical member 443c2 received within the cylindrical member 443c1.

In the illustrated embodiment of FIGS. 12A-12C, the outer cylindrical member/electrode is configured to rotationally drive the end effector and the inner cylindrical member/ electrode is configured to be rotationally driven by the motor and transmission assembly. In another embodiment, the inner cylindrical member/electrode is configured to rotationally drive the end effector and the outer cylindrical member/ electrode is configured to be rotationally driven by the motor and transmission assembly.

In one embodiment, in order for the brake pads 462 to be able to separate from each other, the outer cylinder 444 would be made with a break to be two half cylinders so that the outer cylinder 444 can move radially outward from the inner cylinder 444. In this embodiment, the input cylinder 442 and the output cylinder 444 each could be either the inner cylinder 442 or the outer cylinder 444. This embodiment of FIGS. 12A-12C requires the use of stationary brushes 474, 476 that were discussed in detail above with respect to FIG. 2-5.

That is, the embodiment of FIGS. 12A-12C is same concept as the embodiment of FIGS. 2-5, but instead of an annular plate arrangement of the embodiment in FIGS. 2-5, the electrostatic clutch assembly 418 is configured as two coaxial cylinders 442, 444 where the attractive clutch force is radial. The benefit of this arrangement is to increase surface area by making use of the entire length of the transmission of the drill 400.

Figure 14:
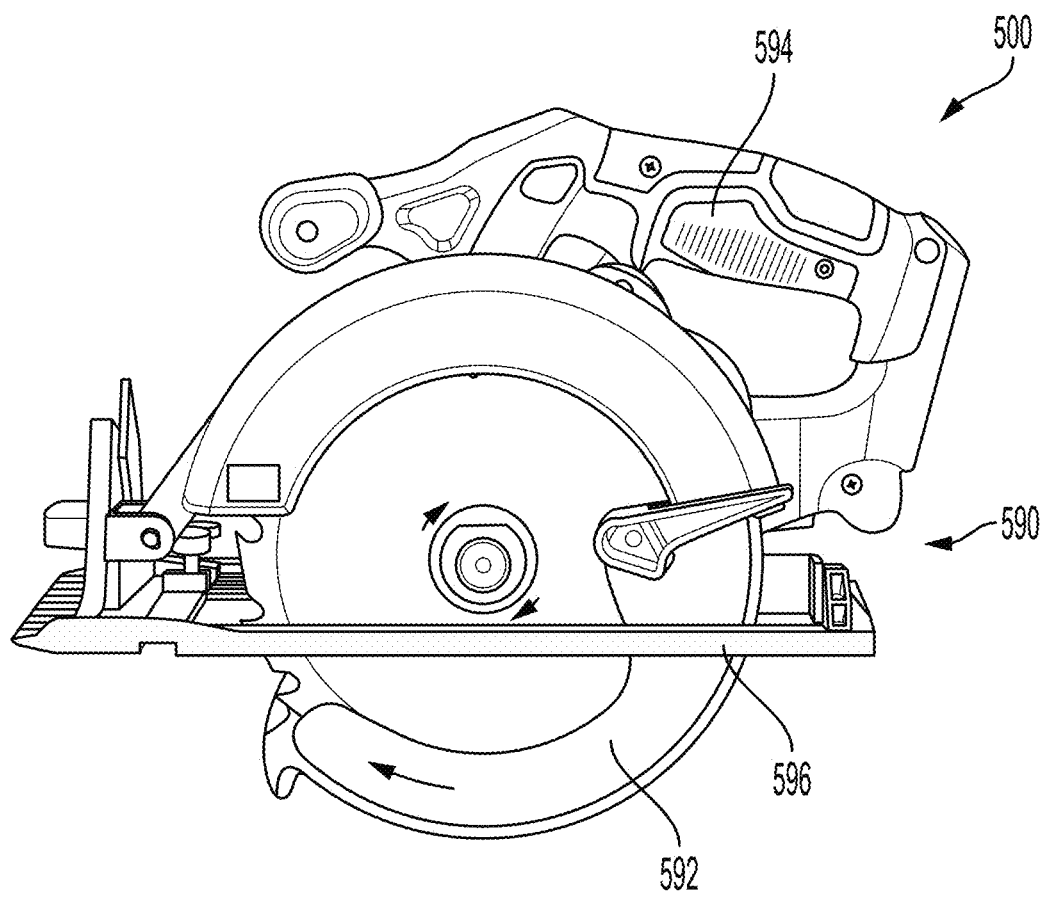
FIG. 14 shows an exemplary power tool that includes a saw braking mechanism having an electrostatic mechanism according to an embodiment of the present patent application.

In one embodiment, as shown in FIGS. 14-17, an electrostatic clutch assembly 518 acts as a brake providing the saw braking mechanism/system/functionality 590. In one embodiment, the saw braking system 590 is used in the power tool 500 as shown in FIG. 14. In one embodiment, the power tool 500, as shown in FIG. 14, is a (portable) circular saw 500 as shown in FIG. 14. In another embodiment, the saw braking system 590 is used in other power tools, such as power miter saw, power circular saw, power reciprocating saw, power table saw, power grinder, power sagittal saw, etc.

In one embodiment, the power tool 500 generally includes a controller, a motor and transmission assembly to drive a saw blade 592, typically through a reduction gearing/transmission, a drive shaft 597 connected to the motor and transmission assembly, the saw blade 592 mounted on the drive shaft 597, the power source (battery or AC power) operatively connected to the motor and transmission assembly and the controller, a handle 594, and a blade guard 598

Figure 15:
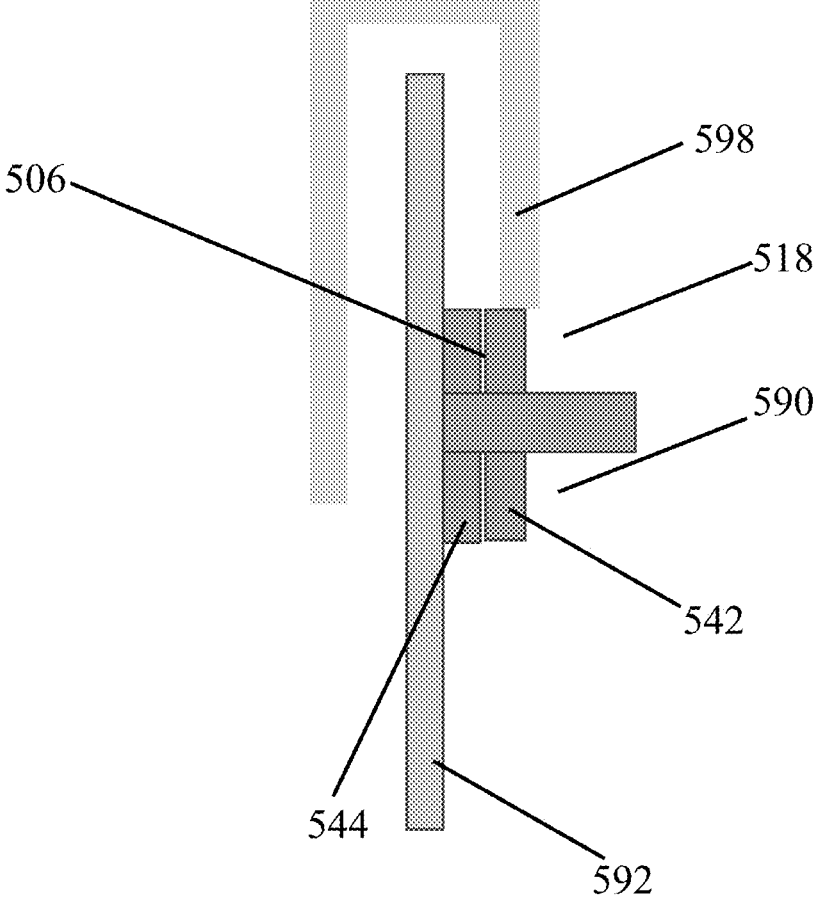
FIG. 15 shows a power tool system that includes a saw braking mechanism having the electrostatic mechanism according to an embodiment of the present patent application.
Figure 16:
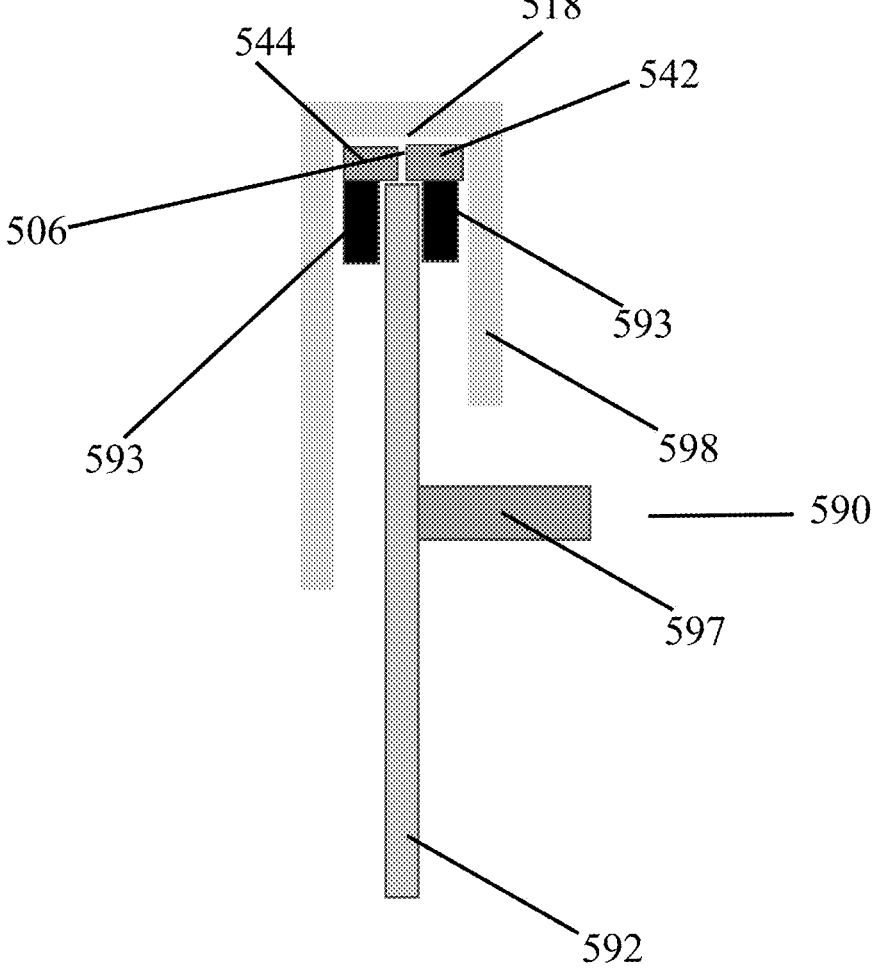
FIG. 16 shows a power tool system that includes a saw braking mechanism having the electrostatic mechanism according to another embodiment of the present patent application.

(as shown in FIGS. 15-17). In one embodiment, the blade guard 598 substantially encloses the saw blade 592. These power tools may include other components that are not discussed in detail here. In one embodiment, the power tool 500 also includes the saw braking system 590 with the electrostatic clutch assembly 518.

In one embodiment, as shown in FIGS. 15-17, the electrostatic clutch assembly 518 includes opposing plates/electrodes 542, 544 and the dielectric layer (i.e., dielectric material or air gap) 506 that separates the electrodes 542, 544. When a voltage, a current or an electric field is applied, the electrodes 542, 544 electrostatically attract, such that above a threshold of the applied voltage the electrodes 542, 544 fully couple and below a threshold of the applied voltage, the electrodes 542, 544 fully decouple.

In one embodiment, the electrostatic coupling of the electrodes 542, 544 is in response to a signal or a sensed value from a sensor. In one embodiment, the power tool 500, as shown in FIG. 14, includes a sensor that is configured to detect flesh of the user at the blade 592. In one embodiment, the sensor is a capacitive sensor. In one embodiment, the sensor is a conduction sensor. In one embodiment, the sensed value is conduction value and/or capacitance value for the purposes of detecting the difference between the user's flesh and wood/or other material of the workpiece on which the power tool 500 is being operated by the user. In one embodiment, the sensed value includes an accelerometer, indicating a rapid acceleration/rotation event (e.g., chainsaw kickback event, e.g., as disclosed in U.S. Pat. No. 7,552,781, which is incorporated by reference in its entirety). In one embodiment, in response to sensing the sensed value, the control circuit may cause a switch to actively engage working elements—e.g., brake may be actuated to stop a flywheel from rotating in a cordless nailer or a brake may be applied to a rotary mechanism in a rotary laser level.

In one embodiment, when the sensor (e.g., capacitive sensor or other sensors) detects flesh at the blade 592, the electrostatically attractive clutch assembly 518 activates in response to the applied voltage and acts with full clamping force arresting the blade 592 and minimizing any user injury. In one embodiment, as shown in FIG. 15, the electrostatically attractive plates 542, 544 are opposing annular disks. In one embodiment, referring to FIGS. 15-17, when the sensor (e.g., capacitive sensor or other sensors) detects flesh at the blade 592, the electrostatic clutch assembly 518 is activated by the controller in response to the signal from the sensor. The electrodes 542, 544 are then electrostatically attracted to each other. The electrostatic clutch assembly 518, thus, acts with full clamping force arresting the blade 592.

In one embodiment, as shown in FIGS. 16-17, the electrodes 542, 544 are combined with braking elements 593 that clamp on the blade 592 directly, either radially or axially. For example, as shown in the embodiment of FIG. 17, the electrodes 542, 544 are combined with the braking elements 593 that clamp on the blade 592 radially, while, as shown in the embodiment of FIG. 16, the electrodes are combined with the braking elements 593 that clamp on the blade 592 axially.

Figure 1:
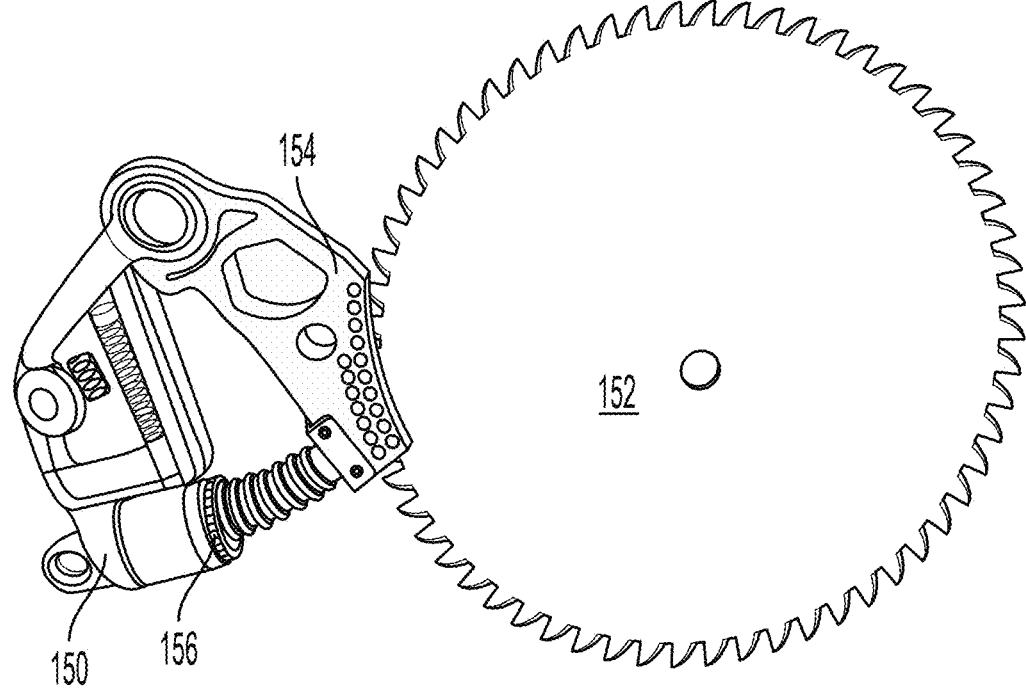
FIG. 1 shows an exemplary prior art saw braking mechanism.

In one embodiment, the saw braking system 590 has several advantages over the prior art saw braking execution described in FIG. 1. For example, the saw braking system 590 of the present patent application is 1) quickly resettable, 2) not consumed, and 3) easily scales down to the size of handheld power tools—e.g., circular saw, reciprocating saw, etc. In one embodiment, the controller of the power saw, in response to the received signal from the sensor, is also configured to stop the rotation of the motor.

In one embodiment, the electrostatically attractive material is deposited on the axial (i.e., non-contact) faces of gears in a transmission, specifically a planetary transmission.

In one embodiment, the electrostatic clutch assembly 518 of the embodiments in FIGS. 15-17 remains fully energized and coupled until reset by the user. In one embodiment, the electrostatic clutch assembly 518 is reset with cycling of the trigger. In one embodiment, the saw braking system 590 with the electrostatic clutch assembly 518 is executed within a threshold volume.

Other applications of the electrostatic clutch/mechanism 518 of the present patent application include a quick release clamp or secure coupling of a battery to a power tool housing. In one embodiment, the user is able to control the amount of slip or rotation, e.g., via a clutch dial, for controlling a speed of retraction of a tape measure.

In one embodiment, the motor, the motor and transmission assembly, the controller, the transmission, and the power source in the power tools 200, 300, 400, and 500 may be similar to the motor 15, the motor and transmission assembly 14, the controller 50, the transmission 16, and the power source 102, respectively as shown and described in other embodiments of the present patent application, and thus these will not be shown and described in detail here.

Although the present patent application has been described in detail for the purpose of illustration, it is to be understood that such detail is solely for that purpose and that the present patent application is not limited to the disclosed embodiments, but, on the contrary, is intended to cover modifications and equivalent arrangements that are within the spirit and scope of the appended claims. In addition, it is to be understood that the present patent application contemplates that, to the extent possible, one or more features of any embodiment can be combined with one or more features of any other embodiment.

What is claimed is:

1. A power tool comprising:
   a housing configured to be coupled to an electrical power source;
   a motor received in the housing;
   an end effector coupled to the housing and configured to perform an operation on a workpiece;
   an electrostatic clutch assembly disposed in the housing between the motor and the end effector, the electrostatic clutch assembly including an input member configured to be rotationally driven by the motor, an output member configured to rotationally drive the end effector, a first electrode electrically couplable to the electrical power source, a second electrode electrically couplable to the electrical power source, and a dielectric layer separating the first electrode from the second electrode; and
   a control circuit disposed in the housing and operatively cooperable with the electrostatic clutch assembly to control electrical power delivery from the electrical power source to the first and second electrodes,
   wherein, in a first mode of operation, the control circuit causes a first voltage to be applied to the first electrode and a different second voltage to be applied to the second electrode, generating a first attractive force between the first and second electrodes, which causes the output member to rotate together with the input member when a torque on the output member is less than or equal to a first threshold value and which causes the output member to rotationally slip relative to the input member when the torque on the output member exceeds the first threshold value, interrupting torque transmission from the input member to the output member.

2. The power tool of claim 1, wherein the first threshold corresponds to the first attractive force.

3. The power tool of claim 1, wherein, in a second mode of operation, the control circuit causes a third voltage to be applied to the first electrode and a different fourth voltage to be applied to the second electrode, generating a second attractive force between the first and second electrodes, which causes the output member to rotate together with the input member when a torque on the output member is less than or equal to a second threshold value and which causes the output member to rotationally slip relative to the input member when the torque on the output member exceeds the second threshold value, interrupting torque transmission from the input member to the output member.

4. The power tool of claim 3, wherein a second voltage difference between the third voltage and the fourth voltage is greater than a first voltage difference between the first voltage and the second voltage, the second attractive force is greater than the first attractive force, and the second threshold value is greater than the first threshold value.

5. The power tool of claim 3, further comprising a selector switch coupled to the housing that is actuatable by a user to select between the first and second modes of operation.

6. The power tool of claim 1, wherein, in a second mode of operation, the control circuit causes a zero voltage difference to be applied to the first and second electrodes, allowing the second electrode to rotate relative to the first electrode and preventing torque transmission from the input member to the output member.

7. The power tool of claim 6, wherein the control circuit is configured to automatically switch from the first mode to the second mode upon sensing that the output member has rotationally slipped relative to the input member.

8. The power tool of claim 6, wherein, in a third mode of operation, the clutch assembly is configured to prevent interruption of torque transmission from the input member to the output member.

9. The power tool of claim 8, wherein, in the fourth mode of operation, the control circuit causes a fifth voltage to be applied to the first electrode and a different sixth voltage to be applied to the second electrode, generating a third attractive force between the first and second electrodes, the third attractive force exceeding a torque on the output member during operation of the power tool.

10. The power tool of claim 1, wherein the second voltage has a polarity opposite a polarity of the first voltage.

11. The power tool of claim 1, wherein the first voltage difference is user selectable to adjust the first attractive force and the first threshold value, and wherein a greater voltage difference corresponds to a greater first attractive force and a greater first threshold value.

12. The power tool of claim 1, wherein each of the first electrode and the second electrode includes an annular plate member.

13. The power tool of claim 1, wherein one of the first electrode and the second electrode includes a cylindrical member and the other of the first electrode and the second electrode includes a different diameter coaxial cylindrical member received within the cylindrical member.

14. The power tool of claim 1, wherein each of the first electrode and the second electrode includes a frictional surface disposed on at least a portion thereof.

15. The power tool of claim 1, wherein the electrostatic clutch assembly includes a plurality of clutch settings, each clutch setting corresponds to a desired output operation of the power tool, and each clutch setting has the set torque.

16. A power tool comprising:
a housing configured to be coupled to an electrical power source;
a motor received in the housing;
an end effector coupled to the housing and configured to perform an operation on a workpiece;
an electrostatic clutch assembly disposed in the housing between the motor and the end effector, the electrostatic clutch assembly including an input member configured to be rotationally driven by the motor, an output member configured to rotationally drive the end effector, a first electrode electrically couplable to the electrical power source, a second electrode electrically couplable to the electrical power source, and a dielectric layer separating the first electrode from the second electrode; and
a control circuit disposed in the housing and operatively cooperable with the electrostatic clutch assembly to control electrical power delivery from the electrical power source to the first and second electrodes,
wherein, in a first mode of operation, the control circuit causes a first voltage difference to be applied across the first electrode and the second electrode, generating a first attractive force between the first and second electrodes, which causes the output member to rotate together with the input member when a torque on the output member is less than or equal to a first threshold value and which causes the output member to rotationally slip relative to the input member when the torque on the output member exceeds the first threshold value, interrupting torque transmission from the input member to the output member, and in a second mode of operation, the control circuit causes a zero voltage difference to be applied to the first and second electrodes, allowing the second electrode to rotate relative to the first electrode and preventing torque transmission from the input member to the output member.

17. The power tool of claim 16, wherein the first voltage difference is user selectable to adjust the first attractive force and the first threshold value, and wherein a greater voltage difference corresponds to a greater first attractive force and a greater first threshold value.

18. The power tool of claim 16, wherein the control circuit is configured to automatically switch from the first mode to the second mode upon sensing that the output member has rotationally slipped relative to the input member.

19. The power tool of claim 16, wherein, in a third mode of operation, the clutch assembly is configured to prevent interruption of torque transmission from the input member to the output member.

20. A power tool comprising:
a housing;
an output shaft;
a motor disposed in the housing and configured to provide a torque to the output shaft;
an electrostatic clutch assembly disposed in the housing and including a first electrode operatively connected to the motor and a second electrode operatively connected to the output shaft; and
a controller disposed in the housing, the controller operatively cooperable with the motor and the electrostatic clutch assembly to operate:

in a clutch mode, wherein an electric field between a first predetermined threshold and a second predetermined threshold is applied across the first electrode and the second electrode causing an electrostatic force between the first electrode and the second electrode to rotationally couple the output shaft with the motor such that the output shaft moves together at the same velocity when the torque therebetween is below a set torque and to permit the motor to rotate at a higher velocity than the output shaft when the torque therebetween is above the set torque, and in a fully disengaged mode an electric field below the second predetermined threshold between the first electrode and the second electrode causes the output shaft to be rotationally decoupled from the motor.

\* \* \* \* \*